US007498953B2

(12) United States Patent
Salser, Jr. et al.

(10) Patent No.: US 7,498,953 B2
(45) Date of Patent: Mar. 3, 2009

(54) SMART TRANSMITTER FOR UTILITY METERS

(76) Inventors: Floyd Stanley Salser, Jr., P.O. Box 772887, Ocala, FL (US) 34477-2887; Ian Phillip Harvey, 59 Allison Road, Brislington, Bristol BS4 4PW (GB); Roger Allcorn, 59 Allison Road, Brislington, Bristol BS4 4PW (GB)

( * ) Notice: Subject to any disclaimer, the term of this patent is extended or adjusted under 35 U.S.C. 154(b) by 74 days.

(21) Appl. No.: 10/989,811

(22) Filed: Nov. 16, 2004

(65) Prior Publication Data
US 2006/0103546 A1 May 18, 2006

(51) Int. Cl.
G08B 23/00 (2006.01)
(52) U.S. Cl. .............................. 340/870.02; 340/636.1; 455/127.1; 455/127.5; 702/63
(58) Field of Classification Search ............ 740/870.02, 740/870.03; 702/63; 455/127.1, 127.5, 128, 455/129; 713/300; 340/636.1
See application file for complete search history.

(56) References Cited

U.S. PATENT DOCUMENTS

| 4,380,089 | A | * | 4/1983 | Weir ........................ 455/127.1 |
| 4,602,218 | A | * | 7/1986 | Vilmur et al. ................ 330/279 |
| 4,636,741 | A | * | 1/1987 | Mitzlaff ...................... 330/127 |
| 4,668,841 | A | * | 5/1987 | Headrick ..................... 136/246 |
| 5,090,689 | A | * | 2/1992 | Petz ................................ 472/3 |
| 5,192,919 | A | * | 3/1993 | Wieczorek .................. 330/129 |
| 5,298,894 | A | | 3/1994 | Cerny et al. |
| 5,335,251 | A | | 8/1994 | Onishi et al. |
| 5,523,751 | A | | 6/1996 | Byford et al. |
| 5,537,111 | A | * | 7/1996 | Martin et al. ................ 340/983 |
| 5,619,192 | A | | 4/1997 | Ayala |
| 6,218,995 | B1 | | 4/2001 | Higgins et al. |
| 6,300,907 | B1 | | 10/2001 | Lazar et al. |
| 6,604,434 | B1 | | 8/2003 | Hamilton et al. |
| 6,612,188 | B2 | | 9/2003 | Hamilton |
| 6,637,911 | B2 | | 10/2003 | Sittner |
| 6,726,964 | B1 | * | 4/2004 | Thompson et al. ........... 427/600 |
| 6,755,148 | B2 | | 6/2004 | Holowick |
| 7,024,321 | B1 | * | 4/2006 | Deninger et al. .............. 702/63 |
| 7,027,843 | B2 | * | 4/2006 | Cromer et al. ............... 455/574 |
| 7,049,976 | B2 | * | 5/2006 | Hunt et al. ............. 340/870.02 |

(Continued)

OTHER PUBLICATIONS

Ansoft Corporation, Smart Antenna Design, 44 pages, Internet (no link available); 2004.

(Continued)

*Primary Examiner*—Albert K Wong

(57) ABSTRACT

The present inventions relate to a smart transmitter technology that provides for a more stable transmitted signal power level, a more stable transmitted signal carrier frequency, a sleep mode without the need for receiving a wakeup signal, and a universal communication interface.

The smart transmitter may comprise selective of a processor, a universal communication interface, transmitter circuitry, a reference-frequency-generator, a depletable power source, and an antenna. The processor configures the transmitter circuitry to adjust the power level of the transmitted signal based on the quality of power supplied to the transmitter circuitry. The processor is further configured to access temperature data from a temperature sensor and compensate for expected changes in the frequency output of the reference-frequency-generator. Finally, the processor is configured to initiate an AutoCommSelect routine that selects the proper universal communication interface configuration and communication protocol required to communicate with a data-source connected to the transmitter.

31 Claims, 16 Drawing Sheets

U.S. PATENT DOCUMENTS 7,061,398 B2 * 6/2006 Holmes et al. ......... 340/870.01
7,129,493 B2 * 10/2006 Garner et al. ............... 250/347

OTHER PUBLICATIONS

Logicon, VersaProbe(R) User's Guide, Aug. 5, 1999, 11 pages.
Northrop Grumman, VersaProbe(TM) Programming Utility, Feb. 10, 2005, Version 2.52, 14 pages.
Mars Company, MARS DataStream—Data Loggers Built For Simplicity, Durability, and Reliability, 1 page; 2004.
Chipcon, SmartRF(R) CC1070 Preliminary DataSheet, Oct. 10, 2003, 45 pages, Rev. 1.0.

* cited by examiner

Prior Art

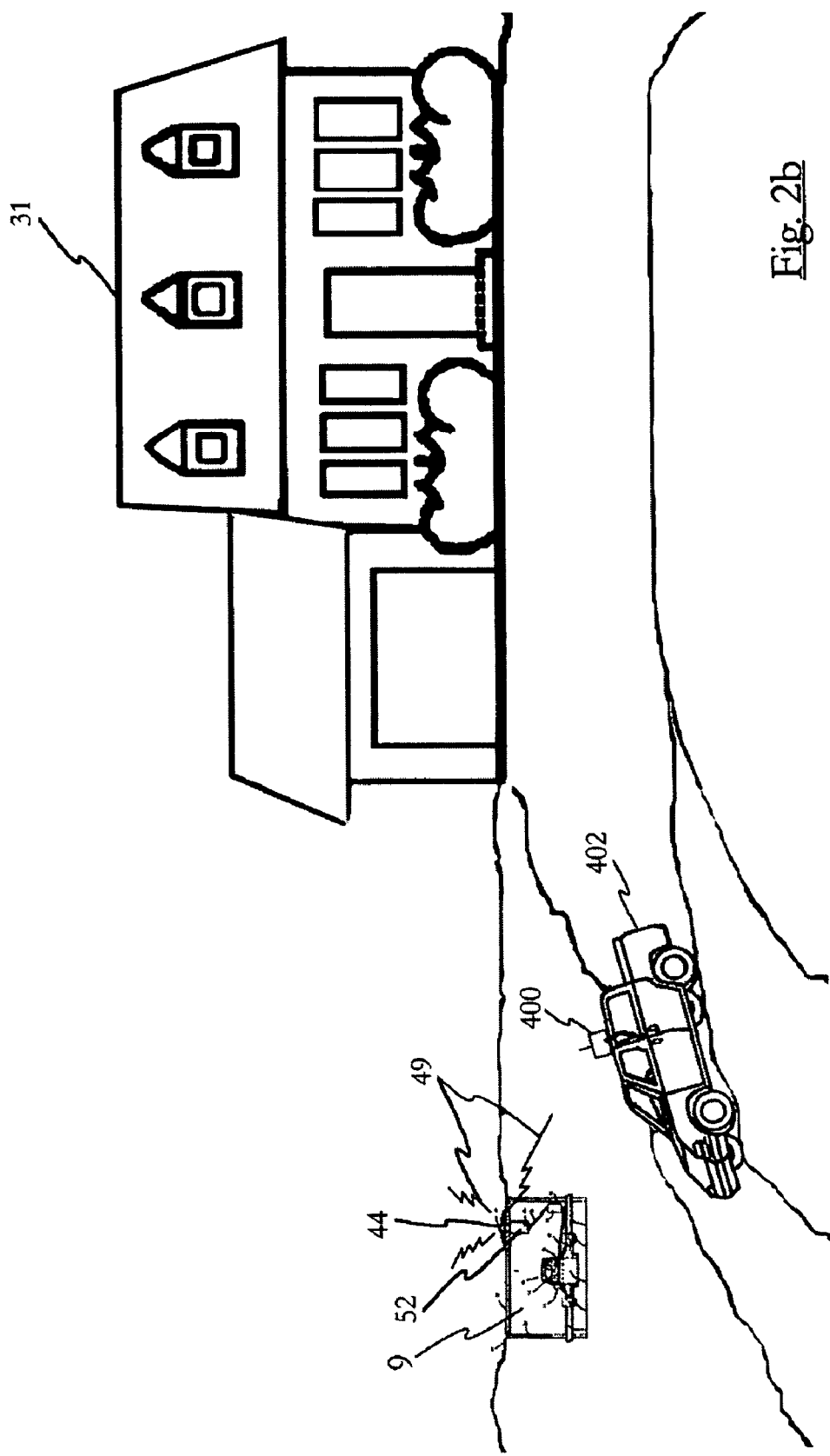

SMART TRANSMITTER FOR UTILITY METERS

TECHNICAL FIELD OF THE INVENTION

The present invention relates to a system and method for transmitting data from a utility meter to a remote location. More particularly, the present invention relates to a system and method for adding Automatic Meter Reading (AMR) capabilities to a utility meter. One embodiment of the system uses a sensor unit that comprises at least two magnetic field sensors to detect the direction and number of rotations of a rotating magnetic field generated by a utility meter where the rotation of the magnetic field is related to the consumption of the commodity being metered. The system then transmits processed or unprocessed sensor data to a remote location where said remote location uses such data for billing purposes.

The system uses a smart transmitter design that can automatically configure its communication circuits to communicate with a plurality of data sources. The smart transmitter is also designed to transmit a data signal according to a predefined time schedule without requiring receiver technology to receive a wakeup signal. The smart transmitter is also designed to maintain a substantially constant transmitted signal frequency by monitoring temperature changes in/near the components that generate a reference frequency used to establish the frequency of the transmitted signal. Finally, the smart transmitter is designed to monitor the status of the power source supplying power to the smart transmitter and make adjustments necessary to maintain a substantially constant transmitted signal power level.

BACKGROUND

Utility meters, including mechanical, electromechanical, and solid state meters, are well known and have been used for many years to measure the consumption of resources such as water, gas and electricity. Water meters, for example, generate data indicative of the consumption of water, where such data is used for billing purposes. Initially, utility meters were mechanical devices. As electronic technology advanced, such technology became smaller and less expensive, and thus, more suitable for use in the highly competitive and cost sensitive utility meter market. As such, the use of electromechanical (hybrid meters) and electronic meters has become more common. Indeed, most modern electricity meters are electronic meters (static meters).

While there are various techniques for measuring fluid flow, most fluid meters are still electromechanical devices. Such fluid meters frequently comprise major components such as a fluid chamber and a register. The fluid chamber often has a fluid input and a fluid output which allows a fluid to flow through the fluid chamber. Typically, a rotating-device is placed within the fluid chamber in the path of fluid flow where such fluid flow causes the rotating device to rotate in proportion to the rate of fluid flowing through the meter.

Various means exists for making the rotations of such a rotating device detectable by components in the register. For example, in many prior art meters, the rotating-device and components in the register are magnetically coupled. In such meters, the rotating-device may be constructed from a magnetic material or have magnetic material associated with the rotating-device. As the rotating device rotates in response to fluid flow through the meter, a rotating magnetic field is created. Components in the register count the number of rotations and use such data to determine and display consumption data. U.S. Pat. No. 6,604,434 issued to Hamilton et al. discloses such a meter and such patent is incorporated by this reference for all purposes.

Traditionally, meter reading personnel would periodically travel to each site where a utility meter was installed, inspect a meter installation and manually record the consumption data. The customer would then receive a bill based on such collected data. Today, modern meters are increasingly equipped with Automatic Meter Reading (AMR) capabilities which provide utility meters with the capability of automatically communicating consumption data to a remote location. Such technology greatly simplifies and lowers the cost of collecting consumption data for billing purposes. However, utility companies have installed millions of utility meters that do not have AMR capabilities. For utility companies to upgrade such meters with AMR capabilities, it has been necessary to replace the entire meter or major meter components (e.g. one or both of the register and fluid chamber). Such upgrades are very expensive. Consequently, there is a need for technology that allows utility companies to upgrade non-AMR equipped utility meters with AMR technology without requiring the replacement of major components of the meter.

Additionally, as noted above, utility meters collect consumption data used by a utility company to bill a utility company's customers. Thus, accuracy in collecting consumption data is critical. Similarly, utility meters are expected to operate accurately for years without failure. Finally, utility companies expect such functionality at the lowest possible price. Consequently, there is a need for a system for adding AMR capabilities to old and new utility meters that is accurate, dependable and cost effective.

Yet another issue that designers of utility meter technology face is supplying power to the meter electronics. In many utility meter environments, easily accessible power from an electrical utility grid is not available. As a result, such meter technology is often powered by a depletable power source such as batteries. Therefore there is a need for AMR technology designed for minimal power consumption so that such technology may be powered for extended periods of time by depletable power sources. In addition, for some installations, there is a need for an apparatus and method for recharging the depletable power source.

To minimize power consumption and component stress, prior art meters employ AMR technology that places the AMR system in an off state. When data is needed from such prior art AMR equipped systems, a remote AMR reader sends a wakeup signal to the AMR equipped meter to activate the transmitter. The transmitter then transmits data to the remote AMR reader. While such a system works well, it requires the remote AMR reader to have relatively expensive transmitter capabilities and the AMR systems installed at the meter to have relatively expensive receiver capabilities. Thus, while power consumption may be minimized for such a system, the technology needed to transmit and receive a wakeup signal adds cost of the system. Consequently, there is a need for an AMR system that can place the AMR transmitter in a sleep mode without requiring a wakeup signal.

Another problem with some prior art AMR systems that transmit a signal to a remote location is that the low cost design of one component might add cost to a second component. For example, some prior art AMR transmitters may be designed for low cost by using lower quality, relatively less expensive components. For such transmitters, the carrier frequency of the transmitter signal may drift over time or the power level of the transmitted signal may weaken over time. While such systems may be designed to minimize the cost of the AMR transmitter technology located at the utility meter, such a design adds costs to the receiver electronics located at a remote location. Thus, there is a need for an AMR transmitter design that minimizes transmitter costs without adding significant costs to the receiver technology design.

Another issue the designers of AMR systems face relates to the diversity of register designs among different meter manufactures and the diverse communication protocols used by such registers. In the area of water meters, for example, while most major water meter manufacturers include a register design incorporating a three conductor interface to facilitate communication with electronic device outside the register (such as a transmitter), such registers use different communication protocols. In most prior art meters, the AMR transmitter communication hardware must be manually configured before the AMR transmitter can communicate with the meter register. Manually configuring an AMR transmitter with the proper communication protocol from a plurality of possible communication protocols is undesirable as it as cost to the AMR transmitter installation process, requires extra training for meter installation personnel, and provides an opportunity for human error. U.S. Pat. No. 5,523,751 issued to Byford et al., incorporated by this reference for all purposes, discloses a meter reading apparatus, such as a hand held probe, which has the ability to automatically communication with a plurality of data sources. While the Byford et al. invention works well for its intended purpose, such a method consumes too much power for a transmitter powered by a depletable power source installed at a customer site. Thus, there is a need for an auto communication configuration apparatus and method that minimizes power consumption and is designed for devices powered by depletable power sources and installed at remote customer locations.

SUMMARY

Objects and advantages of the invention will be set forth in the following description, or may be obvious from the description, or may be learned through practice of the invention.

Broadly speaking, a principal object of the present invention is to provide a method and apparatus for upgrading existing utility meter installations not having AMR capabilities with AMR capabilities without having to replace major meter components.

Another general object of the present invention is to provide a method and apparatus for accurately detecting the direction of rotation and the number of rotations of a rotating magnetic field using sensitive magnetic field sensors that generate sensor output signals in at least one of a digital and analog format while minimizing power consumption.

Still another general object of the present invention is to provide a method and apparatus for controlling magnetic sensors that generate sensor-data indicative of resource consumption, processing the sensor-data, transferring either the processed or unprocessed sensor-data to a remote location and wherein the apparatus is designed to minimize power consumption so the apparatus may be powered by a depletable power source for an extended period of time.

Yet another general object of the present invention is to provide a smart transmitter that can interface with a plurality of data sources incorporating a plurality of communication protocols where the transmitter automatically determines the communication protocol used by a data source in communication with the transmitter.

Another object of the present invention is to provide a smart transmitter with a sleep mode that minimizes power consumption without the necessity for the smart transmitter to be activated via a wakeup signal transmitted by a remote receiver.

Yet another object of the present invention is to provide for a smart transmitter design that allows the use of lower quality and less expensive components thereby lowering the cost of the transmitter without adding significant costs to the receiver technology.

Still another general object of the present invention is to provide for an apparatus and method for recharging the power source that powers the AMR technology located at the utility meter.

Additional objects and advantages of the present invention are set forth in, or will be apparent to those skilled in the art from, the detailed description herein. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

One exemplary embodiment of the present invention relates to novel implementations of magnetic field sensor technology used in conjunction with data collection techniques and Radio Frequency technology to add Automatic Meter Reading (AMR) capabilities to utility meters. In this embodiment of the present invention, at least two magnetic field sensors are configured to fit between the fluid chamber and the register of a utility meter where the fluid chamber generates a magnetic field that varies with the rate of resource consumption. The magnetic field sensors are positioned so that each magnetic field sensor senses the magnetic flux at different points within the said magnetic field. The sensors are configured to generate a sensor-signal reflective of the magnetic flux density being sensed by the respective magnetic field sensor. The magnetic field sensors are operatively connected to a data-unit that receives the sensor signals. The data-unit may comprise a processor and a memory and a communication interface for transferring data to remote meter reading equipment. To conserve power, the data-unit may be further configured to turn off at least one of the magnetic field sensors during predefined time periods.

For the purposes of this document, the term "operatively connected" is defined as a connection between two devices that may be a wired or wireless, direct or indirect connection. For example, assume device A is connected to device B through a wired connection and device B is connected to device C via a wireless connection. For the purposes of this document, device A is operatively connected to device C. Restated, if either of device A or device C can affect the operation of the other, they are operatively connected.

Still another embodiment of the present invention relates to an apparatus for providing AMR capabilities to a utility meter metering the consumption of a resource. The apparatus comprises at least two magnetic field sensors associated with a utility meter, wherein the utility meter generates a magnetic field that varies with the rate of resource consumption. The magnetic field sensors are located so that each sensor senses the magnetic flux at different points within said magnetic field. The magnetic field sensors are further configured to generate a sensor-signal representative of the magnetic flux density being sensed for their respective location. The sensor-signal may be in either digital or analog format and are received by a data-unit operatively connected to the magnetic field sensors. The data-unit comprises a processor and a memory and is connected to a power source. The data-unit processor is configured to receive at least part of the sensor-signal generated by each magnetic field sensor that is operatively connected to the data-unit. At least one of the magnetic field sensor is configured to have an on-state and an off-state which is controlled by the processor. To save energy, the processor is configured to turn off the magnetic field sensor for a predefined sensor-off-time. The processor is further configured to store sensor-data in a memory where such sensor-data comprises at least one of (i) processed senor-signals and (ii) unprocessed sensor-signals. The data-unit may be operatively connected to a communications-device for transferring data from the data-unit to a remote location.

Yet another embodiment of the present invention relates to a magnetic field sensor unit for detecting a varying magnetic field. The sensor unit comprises a first magnetic field sensor positioned within a sensor unit at a first location and a second magnetic field sensor positioned within said sensor unit at a second location. Each magnetic field sensor is configured to generate a sensor-signal representative of the magnetic flux density at their respective location. Such sensor signals may be a digital signal or an analog signal. The magnetic field sensors are operatively connected to a processor. At least one magnetic field sensor is configured to have an on-state and an off-state. During the on-state, the magnetic field sensor is active and generating a sensor-signal. During the off-state the magnetic field sensor is not active and consumes little or no power. The on-state and the off-state of the magnetic field sensor are controlled by one of a sensor-controller operatively connected to the magnetic field sensor or the processor.

Another exemplary embodiment of the present invention is a smart transmitter for transmitting data from a utility meter to a remote location. One possible transmitter configuration comprises a processor, transmitter circuitry and, a depletable power source, wherein said transmitter circuitry is operatively connected to an antenna. The processor is operatively connected to a data-unit containing utility-data. For the purposes of this document, "utility-data" is simply any data provided by a utility meter or components of a utility meter system. The processor is configured to retrieve utility-data from said data-unit and transmit a data-signal to a remote location where the data-signal comprises at least part of said utility-data. The power level of the transmitted data-signal is linked to the status of the depletable power supply that supplies power to the transmitter. Examples of a depletable power source include a battery, super capacitors or other sources of power that deplete over time. Thus, the processor is configured to monitor the status of the depletable power source and to adjust the power level of the transmitted data-signal based on the status of the depletable power source and power-level-adjustment-data stored in a memory associated with said processor. The processor may be further configured to generate depletable power source status data which may be transmitted to a remote location.

Yet another exemplary embodiment of the present invention is a smart transmitter that automatically adjusts the transmitter frequency to compensate for frequency drift due to temperature changes in or near the components that generate a reference-frequency used by the transmitter circuitry. One possible transmitter configuration comprises a processor, a reference-frequency-generator, and transmitter circuitry. The transmitter circuitry is operatively connected to the processor, the reference-frequency-generator and an antenna. The transmitter circuitry is used to generate a Radio Frequency (RF) data-signal to be received by a receiver at a remote location. The reference-frequency-generator comprises frequency-components that generate a reference-frequency that is used by the transmitter circuitry to determine the carrier frequency of the transmitted data-signal. The reference-frequency drifts in response to changes in the temperature of the frequency-components and such reference-frequency drift substantially follows known frequency-drift-data. The frequency-drift-data is stored in a memory associated with the processor. The processor is further configured to access temperature data from a temperature sensor associated with said processor, use said temperature data and said frequency-drift-data to determine a frequency-adjustment-value, and to transfer the frequency-adjustment-value to the transmitter circuitry. The transmitter circuitry is configured use said reference-frequency and said frequency-adjustment-value when determining the carrier frequency of the transmitted data-signal.

Still another exemplary embodiment of the present invention is a smart transmitter having a universal communication interface that provides the smart transmitter with the ability to communicate with a plurality of data sources using a plurality of communication protocols. One possible transmitter configuration comprises a processor, a universal communication interface, and transmitter circuitry operatively connected to an antenna. The processor is operatively connected to a data-source through the universal communication interface. At least two communication-interface-configuration-communication-protocols (CIC-CP) are stored in a memory associated with said processor. The CIC-CP data provides both the universal communication interface configuration information and communication protocol information needed to communication with a data-source. The processor is configured to initiate an AutoCommSelect routine. The AutoCommSelect routine selects the proper CIC-CP data set required to communicate with data-source operatively connected to the processor. The processor retrieves utility-data from the data-source using the selected CIC-CP data set. The processor also remembers the selected CIC-CP data set and uses such configuration and protocol data during future communication sessions between said processor and said data-source.

Another exemplary embodiment of the present invention includes a smart transmitter with a sleep mode but no receiver technology to wake up the transmitter. One possible transmitter configuration comprises a processor and transmitter circuitry operatively connected to antenna. The processor is operatively connected to a data-source containing utility-data. The processor is further operatively connected to a memory that stores transmission-schedule-data. The processor is configured to track the passage of time and generate time-data. The processor is further configured to place the transmitter in a sleep-mode and a transmit-enable mode using said time-data and said transmission-schedule-data. When the time-data indicates that the transmitter should be placed in transmit-enable mode, the processor activates the transmitter circuitry, transfers utility-data to the transmitter circuitry and the transmitter circuitry transmits a data-signal comprising at least part of the utility-data to a remote location. When the time-data indicates that the transmitter should be in sleep mode, the processor places the transmitter circuitry in sleep mode which deactivates the transmitter circuitry.

Another exemplary embodiment of the present invention concerns methodology for providing AMR capabilities to a utility meter and for transmitting data from a utility meter to a remote location. The disclosed methodology may be used, for example, in fluid meters that generate a varying magnetic field where the variation in the magnetic field is relatable to the rate of resource consumption. One embodiment of such methodology comprises the steps of associating a first magnetic field sensor circuit with a utility meter so that such first magnetic field sensor circuit senses the magnetic flux density of the varying magnetic field at a first location. Next, a second magnetic field sensor circuit is associated with said utility meter so that said second magnetic field sensor circuit senses the magnetic flux density of the varying magnetic field at a second location. The next step is to turn on said first magnetic field sensor circuit and said second magnetic field sensor circuit during a predefined sensor-on-time for each respective magnetic field sensor circuit and generate sensor-signals reflective of the magnetic flux density at said first location and said second location. The sensor-signals may comprise either a digital signal or an analog signal. The next step is to turn off said first magnetic field sensor circuit and said second magnetic field sensor circuit during a predefined sensor-off-time for each respective magnetic field sensor. A data-unit is associated with said first magnetic field sensor circuit and said second magnetic field sensor circuit. The data-unit comprises a processor and a memory. A power source is provided for supplying power to the data-unit. Next, sensor-data comprising at least one of processed sensor-signals and unprocessed sensor-signals are stored in the data-unit memory. Next, a communications-device is associated with the data-unit where the communications-device is configured for transferring data from the data-unit to a remote location.

Still another exemplary embodiment of the present invention concerns a methodology for detecting a varying magnetic field. One embodiment of such method comprises the steps of positioning a first magnetic field sensor within a varying magnetic field at a first location and positioning a second magnetic field sensor within a varying magnetic field at a second location. The magnetic field sensors generate sensor-signals representative of the magnetic flux density at said first location and said second location. Next, a data-unit is operatively connected to each magnetic field sensor. The data-unit comprises a processor and a memory. The next step is to store sensor-data in the data-unit memory, wherein such sensor-data comprises at least one of (i) processed sensor-signals and (ii) unprocessed sensor-signals. Next, at least one of the magnetic field sensors is configured to have an on-state and an off-state. The at least one magnetic field sensor is placed in the off-state during a predefined sensor-off-period and placed in the on-state during a predefined sensor-on-period. At least part of the sensor-data is transferred to a remote location using a communications-device operatively connected to the data-unit.

Yet another methodology for transmitting data from a utility meter to a remote location employs a smart transmitter powered by a depletable power source where the transmitter maintains a substantially constant transmitted signal power level. This method comprises the steps of providing a transmitter consisting of a processor, transmitter circuitry, and an antenna. A depletable power source is associated with the transmitter and supplies power to said transmitter. The transmitter is also associated with a data-unit comprising a memory for storing utility-data. Next, power-level-adjustment-data is stored a memory associated with the processor. The processor monitors the status of the depletable power source. The next step is to retrieve at least part of said utility-data from said data-unit and transmit a data-signal comprising at least part of the utility-data to a remote location. The processor adjusts the power level of the transmitted data-signal based on the status of said depletable power source and at least part of said power-level-adjustment-data.

Yet another methodology for transmitting data from a utility meter to a remote location pertains to a smart transmitter that maintains a substantially constant transmitted signal frequency. This method includes the steps of providing a transmitter comprising a processor, transmitter circuitry, and an antenna. The transmitter circuitry is configured to transmit a data-signal to a remote location, wherein the carrier frequency of the transmitted data-signal is linked to a frequency-output generated by frequency-components associated with at least one of said processor and said transmitter circuitry. A data-source is associated with the transmitter wherein the data-source supplies utility-data to the transmitter and wherein said data-signal comprises at least part of such utility-data. The next step is to store at least one of drift curve data and drift rate data in a memory associated with said processor. The drift curve data/drift rate data characterize the drift in the frequency-output due to changes in temperature for at least part of said frequency-components. Next, the transmitter circuitry receives the frequency-output generated by the frequency-components. Then, temperature data for at least part of the frequency-components generated by a temperature sensor associated with said processor is accessed. The next step is to adjust the carrier of the transmitted data-signal to compensate for the expected drift.

Still another method automatically selecting a communication protocol and a communication interface configuration required to transfer data from a data-source to a smart transmitter. This method includes the steps of providing a transmitter comprising a processor and a universal communication interface. A data-source is associated with the transmitter wherein the data-source is configured for transferring utility-data from the data-source to the transmitter via communication interface. The data-source uses a known communication-interface-configuration (CIC) and a known communication-protocol (CP). The next step is to store a plurality of CICs and CPs in a memory associated with the processor. Next, the processor implements an AutoCommCfg routine that selects the CIC and CP required to establish a communication session between the data-source and said transmitter. The processor is further configured to remember the selected CIC and CP and use the selected CIC and CP during future communication sessions with said data-source.

Yet another method for transmitting data from a utility meter to a remote location relates to a smart transmitter having a sleep mode. This method comprises the steps of providing a transmitter comprising a processor and transmitter circuitry and configuring said processor to track the passage of time and generate time-data. Next, transmitter-schedule-data is stored in a memory associated with the processor. The processor is further configured to use the time-data and transmitter-schedule-data to place at least part of the transmitter circuitry into one of a sleep mode and a transmit-enable mode. The processor is further configured to retrieve utility-data from a utility meter operatively connected to the processor. The next step is to transmit a data-signal when the transmitter circuitry is in transmit-enable mode, wherein the data-signal comprises at least part of the utility-data.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 2b presents a pictorial view of one possible utility meter installation including one embodiment of the present invention for a residential customer (31);

Figure 1:
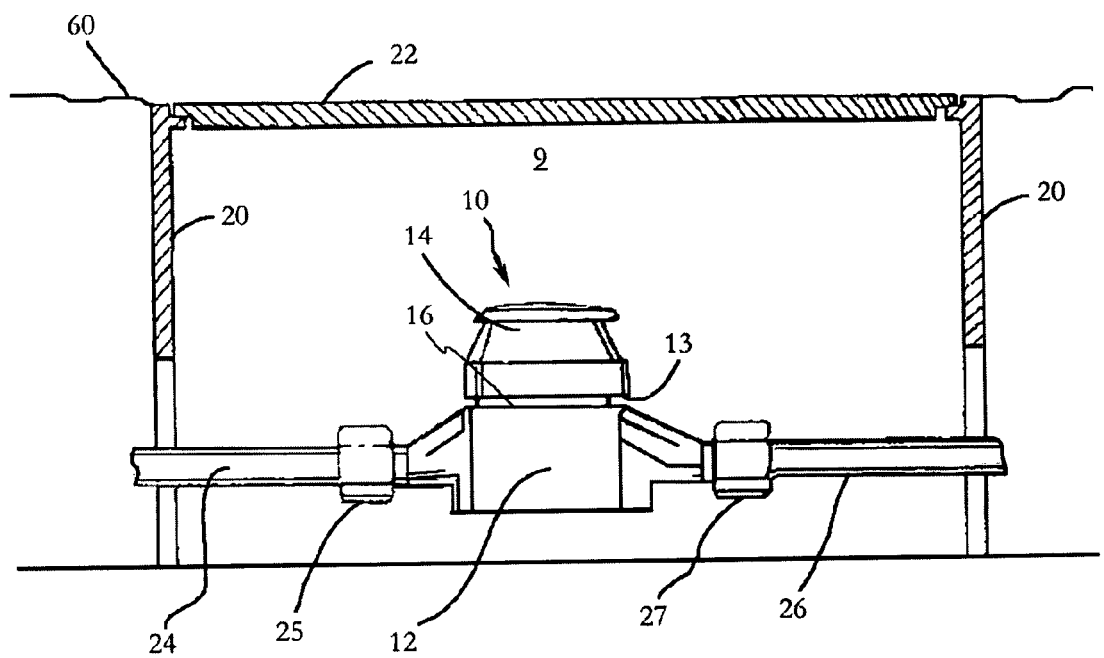
FIG. 1 is a graphic illustration of a side view of an in ground pit (9) enclosure housing a prior art fluid meter without AMR capabilities.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

While the particulars of the present invention may be adapted for use providing Automatic Meter Reading (AMR) capabilities and associated technology to utility meters metering the consumption of commodities such as gas, water, oil, electricity, etc., the examples discussed herein are primarily in the context of water consumption.

FIG. 1 shows an exemplary prior art water meter (10) without AMR technology housed in a below ground enclosure (9), hereafter referred to as "pit" (9). Pit (9) is shown comprising sides (20) and lid (22). Water meter (10) is shown comprising a fluid chamber (12) and a register (14). The bottom (13) of register (14) releasably attaches to the top (16) of fluid chamber (12) forming an enclosed void (not shown) between register (14) and fluid chamber (12). Fluid chamber (12) comprises water inlet (25) and water outlet (27). Water line (24), connects to a water source at one end, runs into pit (9) and attaches to fluid chamber inlet (25) at the opposite end. Water line (26) attaches to fluid chamber outlet (27) at one end and continues through pit (9) to a water consumer. Fluid chamber (12) further houses a rotating element (not shown) that is placed in the path of fluid flow through the meter. The rotating element may be constructed of magnetic material or, alternatively, may be associated with magnetic material (e.g. a magnet). As the rotating element rotates in response to fluid flow through meter (10), a rotating magnetic field is generated. It will be appreciated that the rotating element in fluid chamber (12) may be replaced by other technologies that create other types of magnetic fields that vary over time (e.g. an oscillating element that generates an oscillating magnetic field) without departing from the scope of this invention.

Register (14) houses elements for detecting the rotating magnetic field and associating such rotations with water consumption thereby generating resource consumption data. Register (14) also houses components for displaying consumption data. Such technology is well known the art.

Figure 2A:
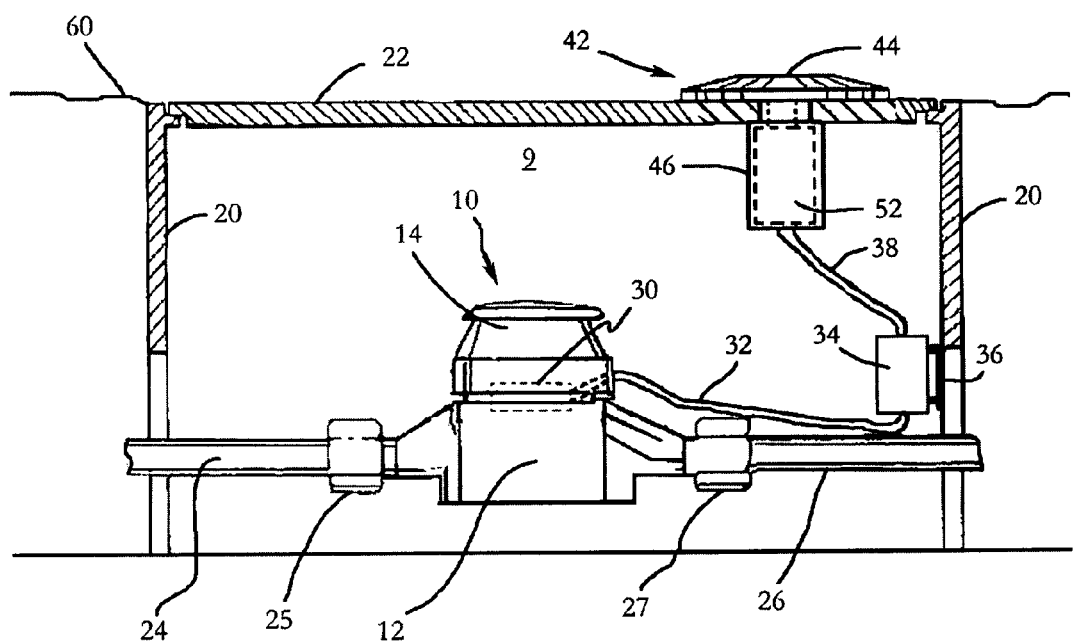
FIG. 2a is a graphic illustration of a side view of an in ground pit (9) enclosure housing the prior art meter of FIG. 1 and AMR technology including a sensor unit (30), a data-unit (34) and a smart transmitter (52) operatively connected to an above ground antenna.

FIG. 2a depicts water meter (10) fitted with AMR technology in accordance to one embodiment of the present invention. Magnetic field sensor-unit (30) is positioned within the enclosed void so that sensor-unit (30) can sense changes in the magnetic flux density of the rotating magnetic field generated within fluid chamber (12). Sensor-unit (30) is connected to a data-unit (34) through sensor-cable (32) in this embodiment of the invention. Data-unit (34) may be attached to pit (9) sides (20) using a standard bracket (36). Data-unit (34) is connected to smart transmitter (52) through a wired or wireless communication link. For the preferred embodiment, data-unit (34) is connected to smart transmitter (52) through data-cable (38).

FIG. 2a further depicts radome-stem housing (42) which is a transmitter-antenna housing comprising a radome section (44) and stem section (46), resting on top of lid (22). More particularly, the bottom of radome section (44) is horizontal to, and rests on top of lid (22) while stem section (46) extends downward through lid (22) and into pit (9). Smart transmitter (52) is housed in stem section (46) and is connected to an antenna (not shown) housed in radome section (44).

FIG. 2b presents a pictorial view of one possible utility meter installation for residential customer (31) where such utility meter installation comprises pit (9) containing a water meter equipped with AMR technology according to one embodiment of the present invention. Radome section (44) housing an antenna (not shown) is shown resting on top of pit lid (22) and radiating data-signal (49). Data-signal (49) is transmitted by smart transmitter (52) and received by automatic meter reading (AMR) equipment. For this embodiment, the AMR equipment comprise receiver (400) associated with vehicle (402).

Figure 2C:
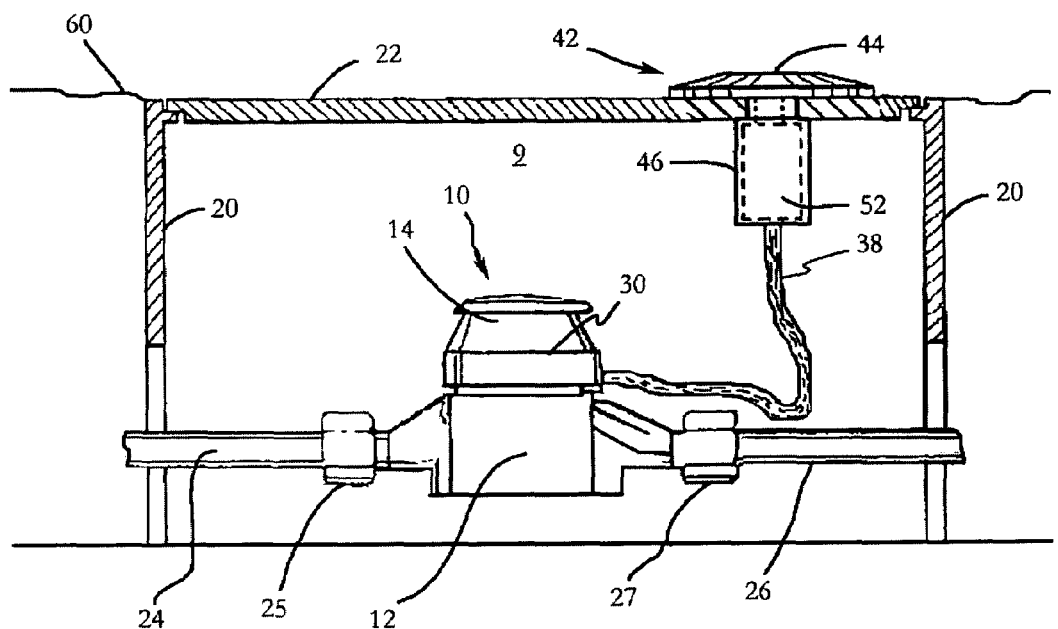
FIG. 2c is a graphic illustration of a side view of an in ground pit enclosure housing the prior art meter of FIG. 1 connected to a smart transmitter (52)

FIG. 2c depicts an alternative embodiment for adding AMR to the prior art meter shown in FIG. 1. For this embodiment, smart transmitter (52) is connected directly to register (14).

Figure 3:
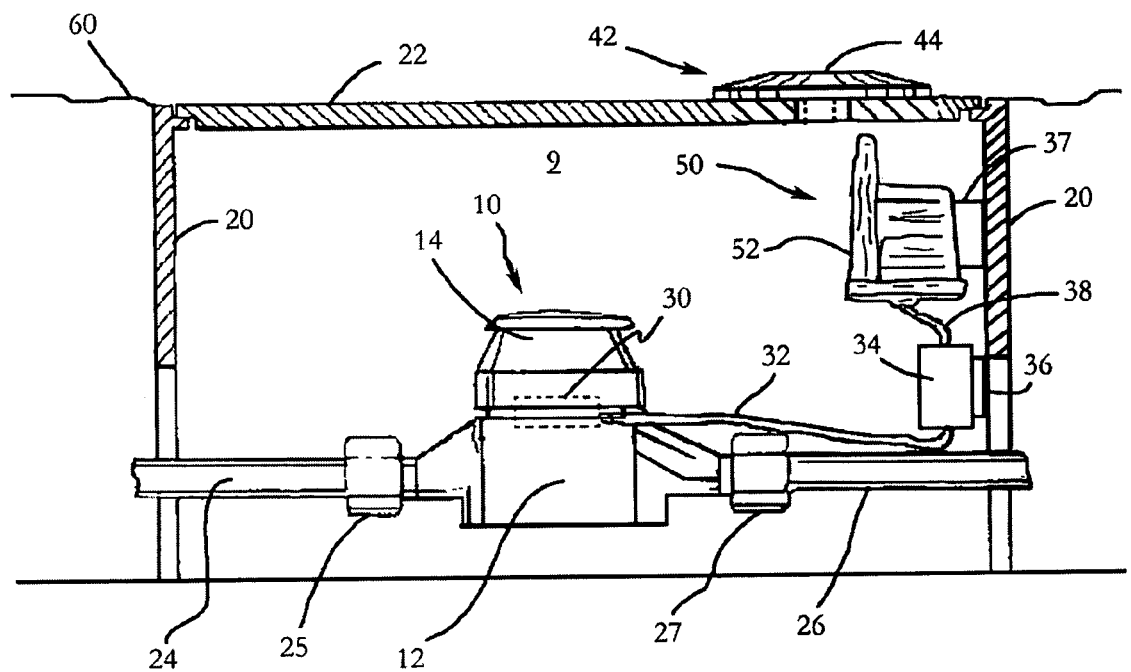
FIG. 3 is a graphic illustration of a side view of an in ground pit enclosure housing the prior art meter of FIG. 1 and AMR technology including a sensor unit (30), a data-unit (34) and a smart transmitter (52) operatively connected to an below ground antenna.

FIG. 3 depicts yet another embodiment of the invention where the radome-stem housing (42) and associated components are replaced with below-ground housing (50) which houses both the smart transmitter and an antenna and mounts to a pit side (20) below lid (22). Below-ground housing (50) comprises transmitter-housing (52) which houses both the transmitter electronics and an antenna. It should be appreciated that a RF-transparent radome section (44) blank may be installed in lid (22).

Photovoltaic Radome

Figure 4:
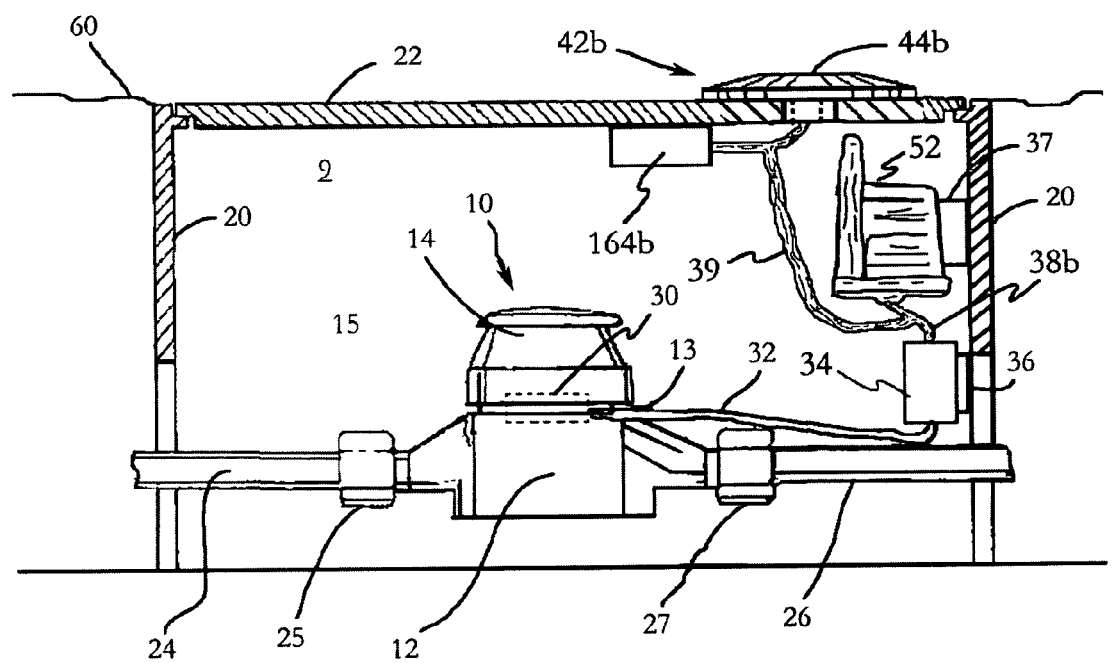
FIG. 4 is a graphic illustration of a side view of an in ground pit enclosure housing the prior art meter of FIG. 1 and AMR technology of FIG. 4 including a rechargeable battery pack (164b) connected to a energy-converter (44b) for recharging the rechargeable battery pack.

Referring now to FIG. 4, still another embodiment of the present invention is shown with rechargeable battery pack (164b) connected to an energy-converter, data-unit (34), and smart transmitter (52). An energy-converter is simply a device that converts energy from one form to another. One example of an energy-converter is photovoltaic-radome (44b) which generates electricity by absorbing electromagnetic radiation.

Figure 5:
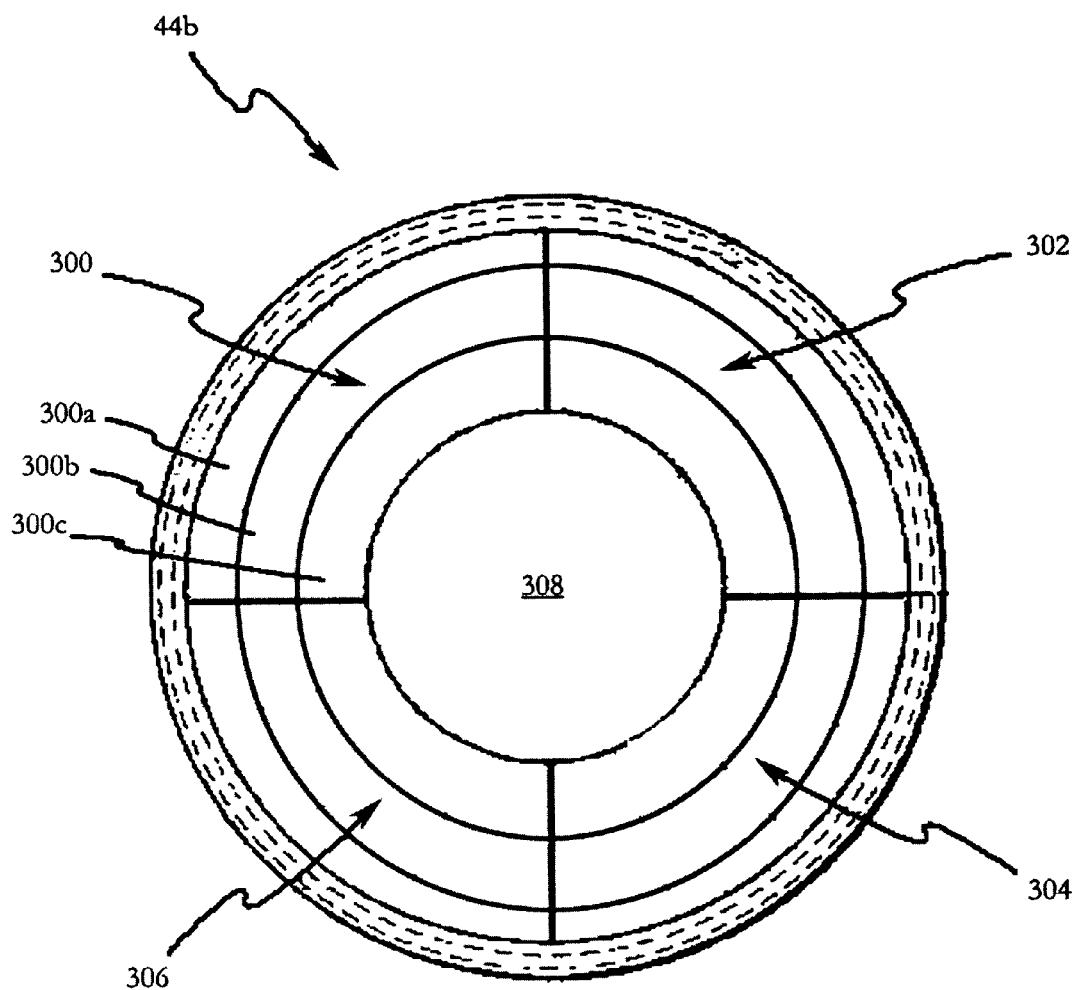
FIG. 5 is a top view of a photovoltaic-radome (44b)

FIG. 5 presents a close-up view of photovoltaic-radome (44b) having four sections of photovoltaic cells (300, 302, 304, 306) surrounding RF transparent center (308). It will be appreciated that the number and shape of sections (300-306) and the number and shape of photovoltaic cells comprising each section may vary depending on any number of parameters including: cost, anticipated installation conditions, antenna design requirements, and power requirements. For the preferred embodiment, each photovoltaic cell section includes three photovoltaic cells. For example, photovoltaic cell section (300) comprises photovoltaic cells (300a), (300b), and (300c). In this embodiment of the present invention, photovoltaic cells (300a), (300b), and (300c) each supply about 0.5 volts at 30-50 milliamps in full sunlight and are connected in series. Such photocell technology is well known in the art.

Figure 6:
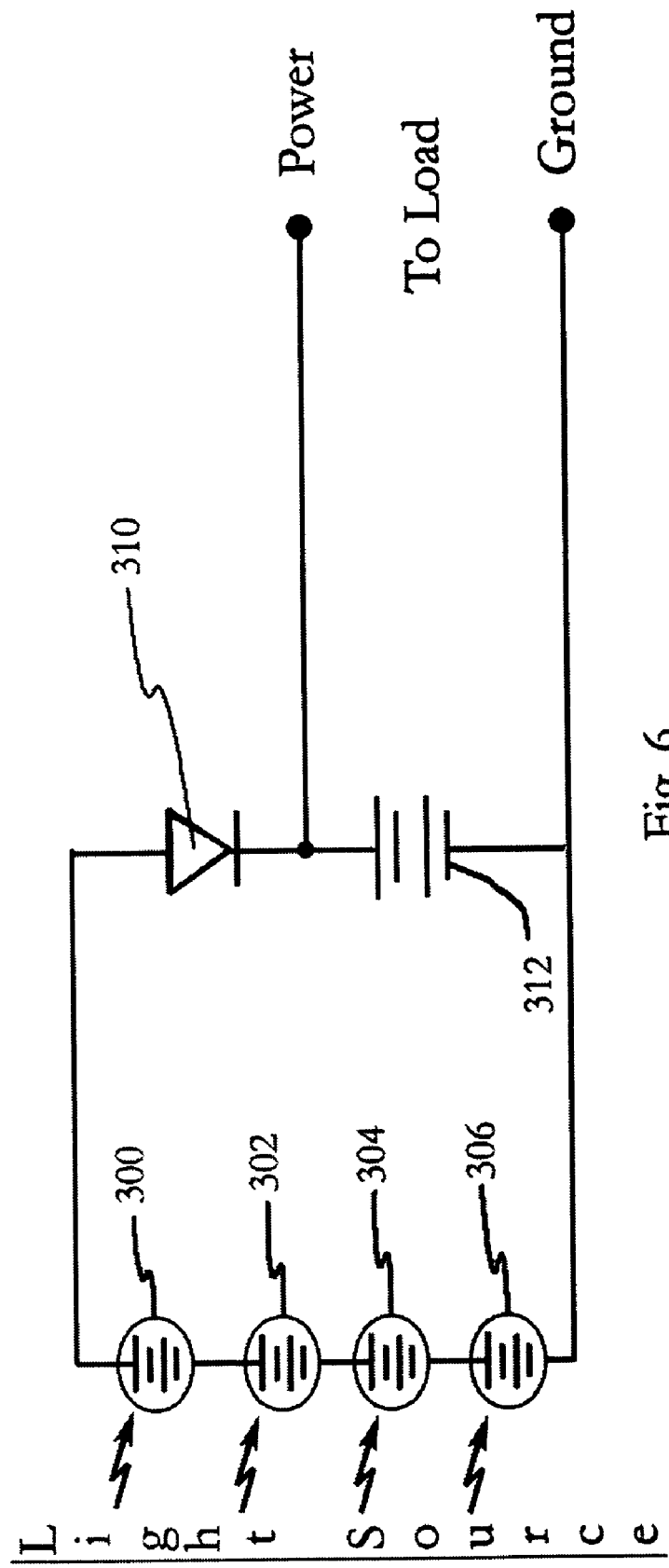
FIG. 6 is a schematic illustration of one exemplary circuit for recharging a depletable power source and/or supplying power to an electronic device connected to the circuit.

FIG. 6 shows one exemplary circuit for recharging battery pack (164b). For the present embodiment of the invention, photovoltaic cell sections (300), (302), (304), and (306) each comprise three photovoltaic cells connected in series. Each photovoltaic cell generates about 0.5 volts at 30 ma-50 ma each in full sunlight. As shown in FIG. 6, photovoltaic cell sections (300), (302), (304) and (306) are connected in series and generate a combined output (no load output) of 6.0 volts. Diode (310) prevents rechargeable batteries (312) from discharging through photovoltaic cell sections (300), (302), (304) and (306) during periods when there is insufficient light for the photovoltaic cells to generate a voltage large enough to forward bias Diode (310). For the preferred embodiment, diode (310) is selected from a diode family that typically exhibits a forward bias diode drop of about 0.3 volts.

Returning back to FIG. 4, power cable (39) comprises a power lead and a ground lead that connects battery pack (164b) to both smart transmitter (52) and data-unit (34) via data-cable (38b). Such a configuration creates a power bus that supplies power to the system components as needed. It will be appreciated that battery pack (164b) may be replaced with storage devices integral to smart transmitter (52) and/or data-unit (34) without departing from the scope of the present invention.

Magnetic Sensors and Sensor Unit

Figure 7:
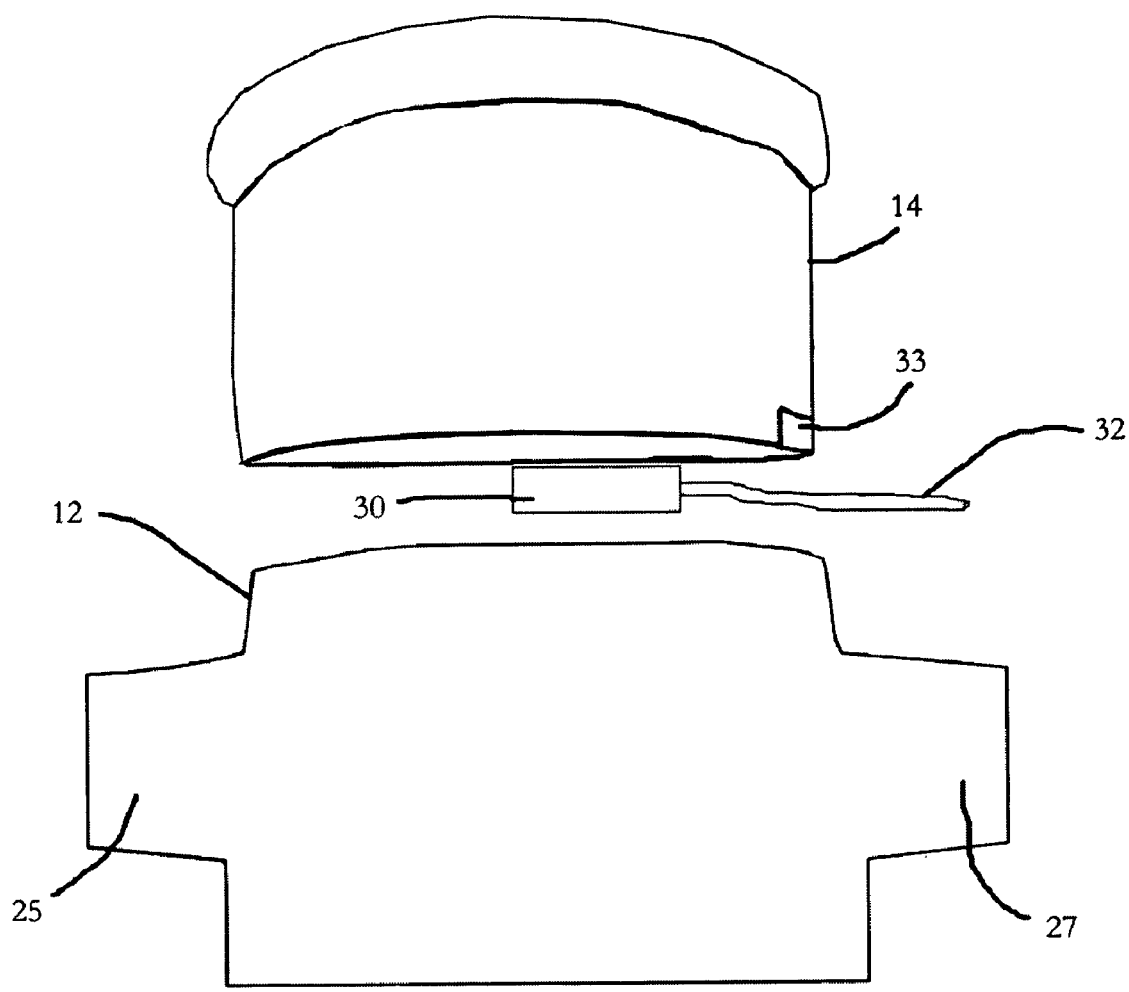
FIG. 7 is a graphic illustration of an exploded close up view of the side of fluid chamber (12), magnetic field sensor unit (30), and register (14)

Referring now to FIG. 7, a graphic illustration of an exploded close up view of the side of fluid chamber (12), magnetic field sensor unit (30), and a register (14) is presented. Magnetic field sensor-unit (30) is constructed to fit in the void between fluid chamber (12) and register (14) where such void is created when register (14) is attached to fluid chamber (12). Also shown in FIG. 7 is cut-out/hole (33). For some embodiments of the present invention, it may be necessary to modify register (14) to include cut-out/hole (33) through which sensor-cable (32) is routed.

Figure 8:
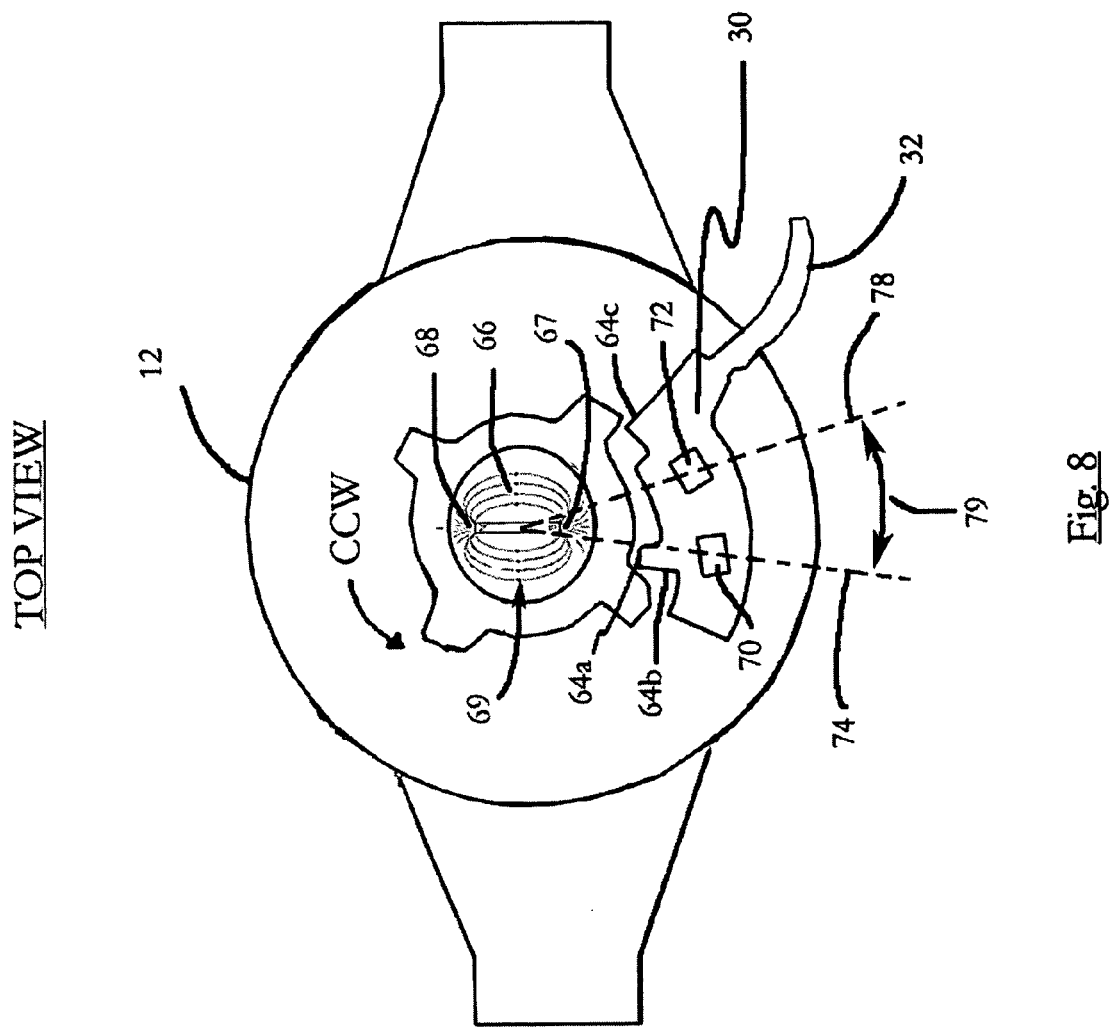
FIG. 8 is a graphic illustration of a top view of a magnetic field sensor unit (30) on top of a fluid chamber (12).

Referring now to FIG. 8, a graphic illustration of a top view of a magnetic field sensor unit (30) resting on top of fluid chamber (12) is depicted. Magnetic field sensor unit (30) is shown comprising magnetic field sensors (70) and (72). Magnetic field sensor unit (30) may comprise alignment surfaces (64a), (64b), and (64c). Such alignment surfaces provide for more accurate sensor positioning within the void between register (14) and fluid chamber (12).

For the preferred embodiment of the present invention, magnetic field sensors (70) and (72) are small in size, optimized for sensitivity, provide for a directional response, and provide an output voltage that is proportional to the magnetic flux density being sensed. Examples of such sensor technology include fluxgate magnetometer sensors, magnetoinductive magnetometer sensors, magnetoresistive sensors, and Hall Effect sensors. For the preferred embodiment, Hall-Effect sensors are used as they have the ability to measure magnetic flux densities from at least 0.5 µT to about 5T. In addition, there are many commercially available Hall-Effect sensor technologies ranging from the basic Hall-Effect device to integrated circuits comprising a Hall-Effect sensor. Such sensors may provide linear outputs as well as digital outputs. It will be appreciated that while Hall-Effect sensors that provide a digital output may be used without departing from the scope of the invention, for the preferred embodiment, Hall-Effect sensors with linear outputs are used. Such technology is well known in the art.

Sensor unit (30) is optimized for speed in relation to the amount of time required to complete a measurement cycle. One exemplary measurement cycle includes a sensor circuitry turn-on time, the measurement time, and a sensor circuitry turn-off time. Accordingly, for the preferred embodiment, sensor unit (30) includes at least one integrated chip comprising at least one Hall-Effect sensor utilizing a full resistive bridge with no other "slow" on-chip electronics (such as slow amplifiers) that would substantially lengthen the turn-on time, measurement time, and turn off time cycle of the magnetic field sensors. By eliminating slow on-chip amplification circuits, a discrete off-chip amplifier, designed for speed and low current consumption, may be used. Such a design allows magnetic field sensors (70) and (72) to be turned on and off between measurements to minimize power consumption by magnetic field sensor unit (30).

Figure 9:
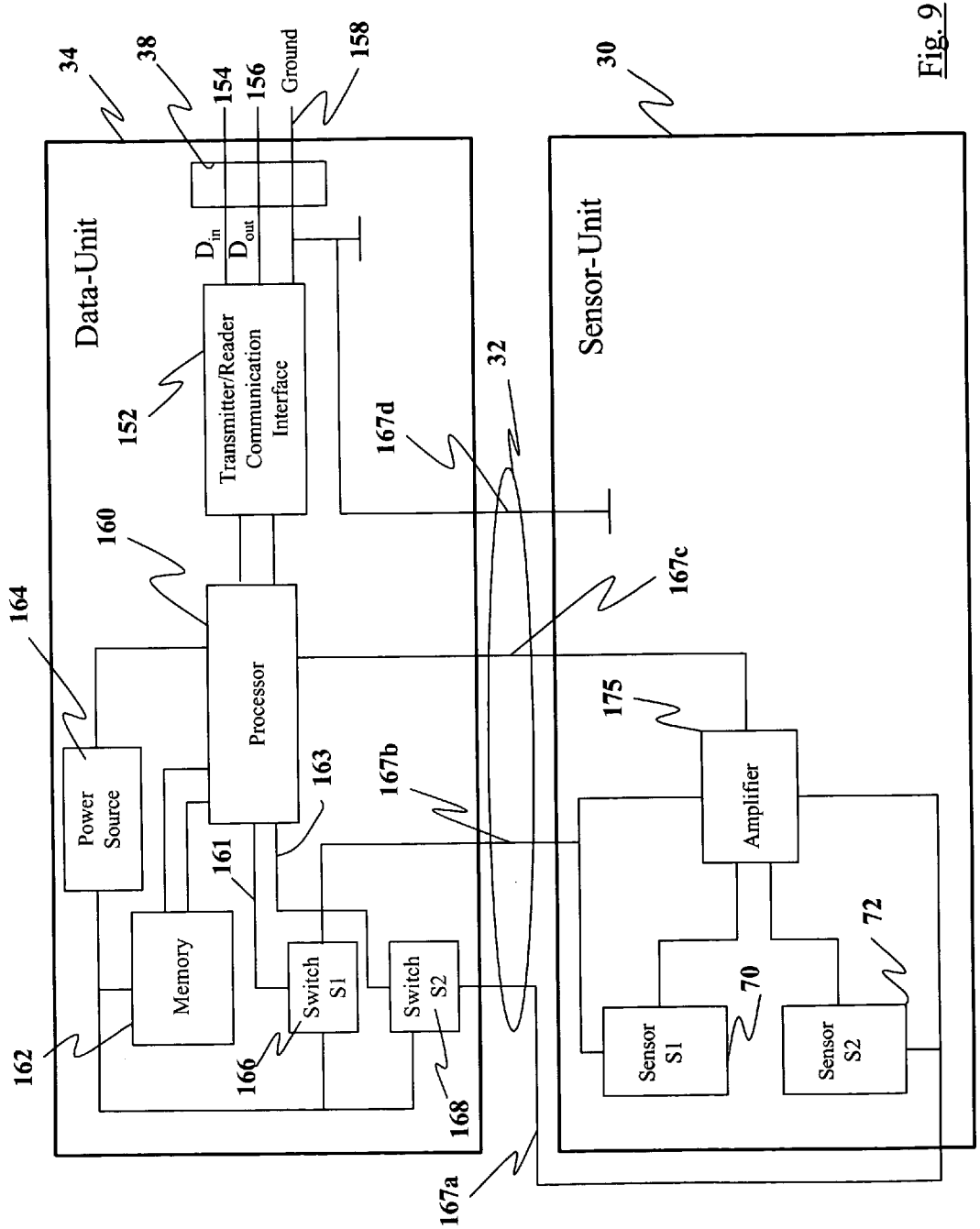
FIG. 9 is a block diagram illustration of one embodiment of a data-unit and one embodiment of a sensor-unit.

Referring now to FIG. 9, one exemplary block diagram representation for data-unit (34) and sensor-unit (30) is presented. Data-unit (34) is connected to sensor-unit (30) through sensor-cable (32) and connected via transmitter/reader communication interface (152) to a transmitter, a touch pad, or other suitable technology for transferring data from one electronic device to another. For the present embodiment, data-unit (34) is operatively connected to remote meter reading equipment through smart transmitter (52), shown in FIG. 9b.

As shown in FIG. 9, data-unit (34) comprises a transmitter/reader communication interface (152). Transmitter/reader communication interface (152) is connected to smart transmitter (52) through data-cable (38). For the preferred embodiment, data-cable (38) is a three conductor cable comprising two data lines (154, 156) and a ground (158) over which serial communications is conducted. It will be appreciated that other wiring configurations and communication protocols may be used over wired or wireless communication connections and interfaces without departing from the scope of the present invention. When transmitter/reader communication interface (152) is connected to a transmitter or a touch pad, such interface facilitates the transfer of data from data-unit (34) to remote meter reading equipment. When transmitter/reader communication interface (152) is connected to a computing device, such interface facilitates programming or reprogramming of the data-unit (34).

Data-unit (34) further comprises a processor (160) and memory (162). While memory (162) is shown in FIG. 9 as a discrete component, it should be appreciated that memory (162) my also be on-board (integrated into) processor (160). For the preferred embodiment, memory (162) is a non-volatile memory used to store at least one of programming code, resource-consumption-data, sensor data, meter k factor, meter identification number, initial meter reading, date and time, and a communication protocol.

Power source (164) may be any suitable power source for supplying power to the data-unit (34) electronics. For the preferred embodiment of the present invention, power source (164) is a component of data-unit (34). Alternatively, power source (164) may be separate from data-unit (34). For example, power source (164) could be replaced by battery pack (164b). When power source (164) is a battery, such a battery may be rechargeable and may be recharged by an energy converter connected to the battery. For the purposes of the present invention, while rechargeable, such a rechargeable battery configuration is one example of a depletable power source.

Still referring to FIG. 9, data-unit (34) is connected to sensor-unit (30) through sensor-cable (32). Sensor-cable (32) comprises power lines (167a) and (167b), data line (167c), and ground line (167d). Power source (164) connects to the inputs of switches (166) and (168) whose outputs are connected to power lines (167b) and (167a) respectively. Processor (160) controls the on/off status of switch (166) and switch (168) through control lines (161) and (163) respectively. With such a configuration, processor (160) can turn sensors (70) and (72) on and off.

For this embodiment of the present invention, Sensor-unit (30) comprises two magnetic field sensors, sensor (70) and sensor (72). The outputs of sensor (70) and (72) are connected to the input of amplifier (175). Amplifier (175) is designed so have a short turn-on time and low power consumption when on. The output of amplifier (175) is connected to data line (167c), which directs the amplified sensor-signals to processor (160). Alternatively, sensor (70) may be connected to a first amplifier while sensor (72) is connected to a second amplifier with the amplifier outputs both being connected to data line (167c). In yet another alternative embodiment, the output of sensor (70) is connected to data line (167c) while the output of sensor (72) is connected to processor (160) through a second and separate data line using a 5-wire sensor cable.

Processor (160) controls the open/closed state of switches (166) and (168) using predefined sensor-on-time/sensor-off-time values. For example, the on-off algorithm may be a simple predefined on-time/off-time alternating sequence. Provided that the on/off cycle is at a rate faster than the rotational rate of rotating magnetic field (69), there will be no aliasing and accurate sensor-signals can be generated. In an alternative embodiment, a separate sensor-controller, comprising a processor and memory, may be used to control the sensors.

For the preferred embodiment, processor (160) is configured to execute a sensor control program stored in at least one of memory (162) or some other memory associated with processor (160). Also stored in memory (162) are predefined sensor-off-time values, sensor-on-time value, and a delay value. It will be appreciated that each sensor may have its own sensor-off-time/sensor-on-time values or they may use the same values and such values may be user programmable with limitations to prevent the previously described aliasing problem.

For the preferred embodiment, the sensor-on-time is 2 µs for both sensors and the sensor-off-time is 1.0 ms for both sensors and the delay value is 1 µs. Using such values, at the start of the initial measurement cycle upon power up of processor (160), sensor (70) and sensor (72) are both off. Processor (160) turns on sensor (70) and receives sensor-signals generated by sensor (70). After 2 µs has elapsed, processor (160) turns off sensor (70). After 1 µs (the delay value) has elapsed, processor (160) turns on sensor (72) and receives sensor-signals generated by sensor (72). After 2 µs has elapsed, processor (160) turns off sensor (72). One of ordinary skill in the art will appreciated that the delay value is only used once and sets the delay period between turning sensor (70) off and turning sensor (72) on.

When it is determined that sensor (70) has been in the off-state for 1 ms, processor (160) turns sensor (70) on and receives sensor-signals generated by sensor (70). When it is determined that sensor (72) has been in the off-state for 1 ms, processor (160) turns sensor (72) on and receives sensor-signals generated by sensor (72). This sequence continues until processor (160) loses power, processor (160) is stopped or processor (160) is reconfigured/reprogrammed.

It should be appreciated that processor (160) may store processed or unprocessed sensor-signals in a memory associated with processor (160). Alternatively, processor (160) may simply route the sensor-signals to another electronic device.

It will be appreciated by one of ordinary skill in the art that since the magnetic field sensors used provide a quantitative output representing the magnetic flux density being sensed by each respective magnetic field sensor, the above described magnetic field sensing apparatus and method is similar to digital sampling of the magnetic field. Importantly, such sampling data may be used to determine both the direction of rotation and the number of rotations for rotating magnetic field (69). Such functionality is accomplished by examining the sensor-signal trends for both sensor (70) and sensor (72).

For other alternative embodiments of the present invention, more complex sensor control algorithms may be implemented where such algorithms are designed to maximize power savings. A more complex alternative processor control routine for sensor (70) and sensor (72) is now considered.

Returning to FIG. 8, one exemplary rotating magnetic field (69) is shown in the center of fluid chamber (12). Magnetic flux lines (66) of rotating magnetic field (69) extend form the north pole (68) to the south pole (67) of the magnetic component associated with a rotating element within fluid chamber (12). Rotating magnetic field (69) rotates in the CCW direction (CW is in the opposite direction) in response to fluid flow through fluid chamber (12) from a utility provider to a utility consumer. To simplify the drawing, not all magnetic flux lines for rotating magnetic field (69) are shown, and in particular, the magnetic flux lines making up the portion of rotating magnetic field (69) that are impinging on the surface of magnetic field sensors (70) and (72) and not specifically depicted.

Still referring to FIG. 8, the placement of magnetic field sensors (70) and (72) relative to each other and rotating magnetic field (69) is now considered. Line (74) begins at the center of rotating magnetic field (69) and passes through the center of magnetic field sensor (70). Similarly, line (78) begins at the center of rotating magnetic field (69) and passes through the center of magnetic field sensor (72). Lines (74) and (78) form angle (79).

Using such a configuration, as rotating magnetic field (69) rotates in the CCW direction, the intensity the magnetic field (and thus the number of flux lines) impinging on the surface of magnetic field sensors (70) and (72) will vary. More importantly, for the CCW direction of rotation, magnetic field sensor (70) will sense such changes in the magnetic field before such changes are sensed by magnetic field sensor (72). One of ordinary skill in the art will appreciate that with such a dual magnetic field sensor configuration, both the number of rotations and the direction of rotation for rotating magnetic field (69) may be determined.

Figure 10:
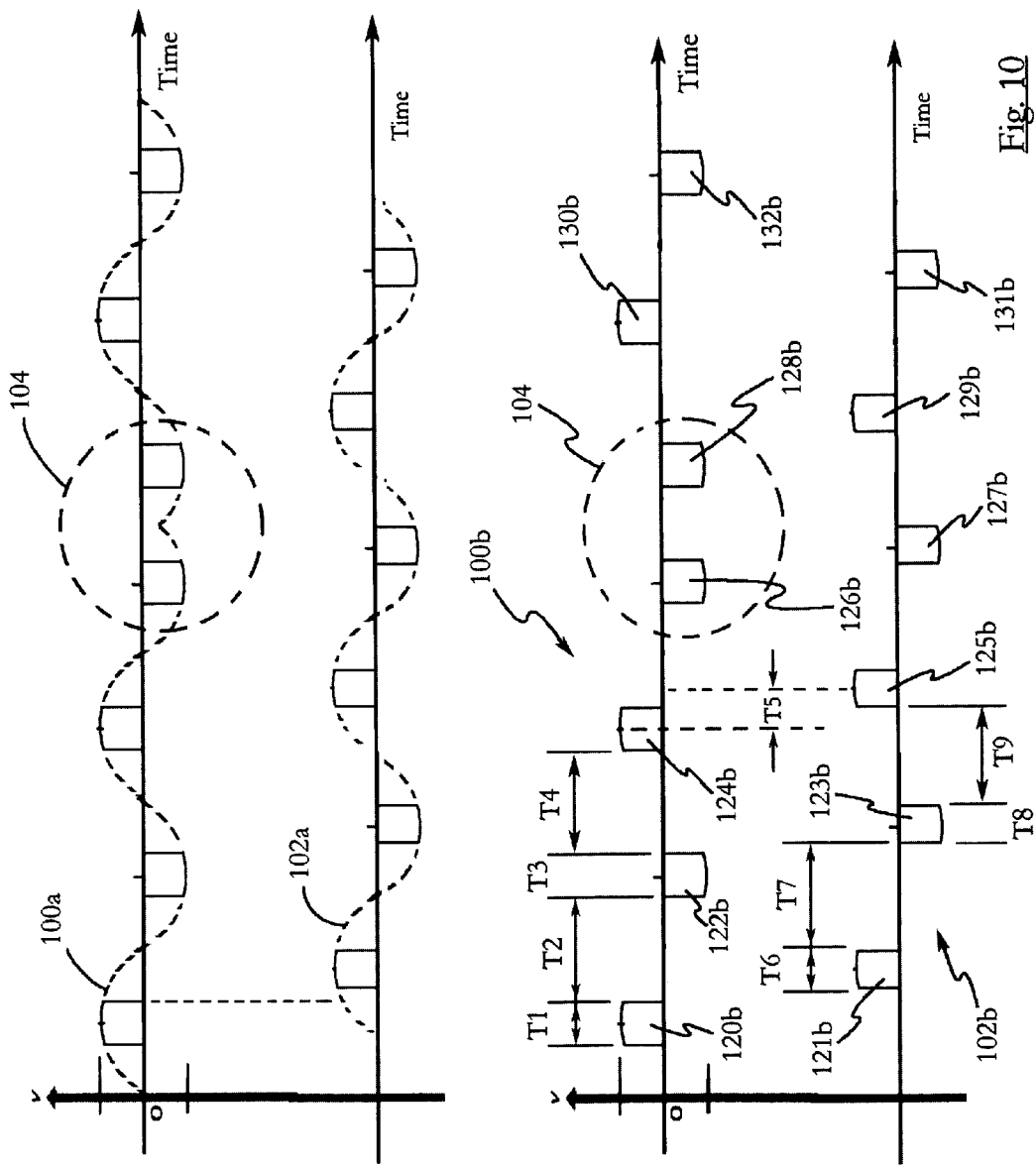
FIG. 10 is a plot of two exemplary magnetic field sensor signals and associated timings.

Referring now to FIG. 10, exemplary magnetic field sensor outputs and associated timings are presented. The top waveform set depicted in FIG. 10 shows sine wave (100a) and (102a). Sine wave (100a) is one possible sensor-signal output for magnetic field sensor (70) and sine wave (102a) is one possible sensor-signal output of magnetic field sensor (72). It should be noted that sine wave (100a) and (102a) depict the expected sensor-signal outputs if such sensors are continuously powered and generating outputs. As noted previously, however, magnetic field sensors (70) and (72) are turned off for a predefined period of time to reduce power consumption. The bottom waveform set depicted in FIG. 10 shows exemplary magnetic sensor outputs reflecting predefined sensor-on times and sensor-off times.

Exemplary sensor on-times and off-times for magnetic field sensors (70) and (72) are now considered. One complete on-time and off-time cycle for magnetic field sensor (70) is represented by time periods T1, T2, T3, and T4. Time periods T1 and T3 represent predefined "on-time" periods for magnetic field sensor (70) and time periods T2 and T4 represent predefined "off-time" periods. Preferably, time period T1 coincides with the moments in time when the south pole of rotating magnetic field (69) approaches, reaches, and passes its closest point to magnetic field sensor (70). Similarly, time period T3 represents the sensor on-time for magnetic field sensor (70) preferably coinciding with the moments in time when the north pole of rotating magnetic field (69) approaches, reaches, and passes its closest point to magnetic field sensor (70). Time period T2 represents a predefined sensor-off time for the period of time between time period T1 and T3. Time period T4 represents the sensor-off time for the period of time between the end of time period T3 and the beginning of next cycle. It will be appreciated that time periods T6, T7, T8, and T9 are time periods associated with magnetic field sensor (72) and are analogous to the T1, T2, T3, ant T4 time periods for magnetic field sensor (70).

Still referring to FIG. 10, time period T5 is shown as the time period between the peak positive magnetic sensor output for magnetic field sensor (70) and the peak positive sensor output for magnetic field sensor (72). Referring back to FIG. 8, one of ordinary skill in the are will appreciate that as rotating magnetic field (69) rotates in the CCW direction, the south pole of rotating magnetic field (69) reaches it closest point to magnetic field sensor (70), and as rotating magnetic field (69) continues to rotate in the CCW direction, finally reaches it closest point to magnetic field sensor (72). Thus, it will be appreciated that time period T5 is directly related to angle (79).

FIG. 10 also depicts exemplary magnetic field sensor outputs for a point in time where the rotating magnetic field (69) changes direction. For example, Table 1 below lists the exemplary sensor output sequence for both magnetic field sensor (70) and magnetic field sensor (72) for wave forms 100b and 102b.

TABLE 1

| | OUTPUTS | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Magnetic Sensor 70 | +120 | | −122 | | +124 | | −126 | | −128 | | +130 | | −132 |
| Magnetic Sensor 72 | | +121 | | −123 | | +125 | | −127 | | +129 | | −131 | |

As can be seen in Table 1, magnetic field sensor (70) generates a positive output (+120) and then magnetic sensor (72) generates a positive output (+121). Next, magnetic sensor (70) generates a negative output (−122) followed by negative output (−123) generated by magnetic sensor (72). Thus, while rotating magnetic field (69) is rotating in the CCW direction, the output of magnetic field sensor (70) will "lead" the output of magnetic sensor (72). Restated, magnetic field sensor (70) will generate a positive output and then magnetic field sensor (72) will generate a positive output. Next, magnetic field sensor (70) will generate a negative output followed by a negative output generated by magnetic field sensor (72). This sequence will continue as long as rotating magnetic field (69) rotates in the same direction.

As shown in Table 1, when rotating magnetic field (69) changes its direction of rotation, one of the magnetic field sensors may generate two outputs of the same polarity (depends on the timing at the moment of the change in direction of rotation). More importantly, the magnetic field sensor output that was leading (as described above) will now lag. For example, as shown in Table 1, magnetic field sensor (70) generates two consecutive negative pulses, pulse (−126) and pulse (−128). At this point it should be apparent that the output of magnetic field sensor (72) starts to lead magnetic field sensor (70) signifying that the direction of rotation for magnetic field (69) has changed. Thus, by determining which sensor output leads and/or which sensor output lags, one can determine the direction of rotation. There are numerous well known electrical circuits and methods for processing signals such as those generated by magnetic field sensors (70) and (72) that will facilitate both counting the number of magnetic sensor output pulses (i.e. the number of rotations) and determine which sensor output leads the other (i.e. the direction of rotation).

From the above discussion, one of ordinary skill in the art will appreciate that the above technology allows one to determine and track the number of rotations and the direction of rotation of rotating magnetic field (69). With such information, one can determine the net rotations for rotating magnetic field (69). Consequently, by measuring or knowing the meter k factor (e.g. meter "k factor" may be the amount of fluid that flows through the meter for each rotation of a rotating element) the net quantity of fluid that pass through fluid chamber (14) may be determined. By way of example, the outputs depicted in Table 1 show that rotating magnetic field (69) rotated two full turns in the CCW direction (points 1-8), changed direction at point 9 (output −128), then rotated in the CW direction (CW is the opposite direction of CCW) for about 1 turn, yielding a net rotation of about 1 turn in the CCW direction. Thus, if the meter "k factor" is 0.1 gallons/turn, then 0.1 gallons of fluid flowed in the CCW direction (1 turn×0.1 gallons/turn=0.1 gallons).

System Monitoring

Referring now to other features of data-unit (34), processor (160) may be further configured to monitor the operational status of various components of the system. One system component processor (160) monitors is the power source (164). Processor (160) may be configured to monitor the voltage level supplied by power source (164) and generate and/or store power source status information. Power source status information may be a simple binary good/bad flag. Alternatively, power source status information could be the measured voltage level supplied by the power source.

For the preferred embodiment of the present invention, processor (160) monitors the status of power source (164) using a two input comparator. The first input to the comparator is a reference-voltage and the second input to the comparator is the voltage supplied by power source (164). The reference-voltage may be equal to a predefined minimum value for power source (164). When processor (160) determines (using the comparator circuit) that the voltage supplied by power source (164) has dropped below the reference-voltage, a power good/bad flag is set to a value that signifies there are problems or may soon be problems with the power source. Processor (160) may then transfer the power source status information to remote meter reading equipment operatively connected to data-unit (34).

Processor (160) is also configured to monitor the sensor-signals generated by magnetic field sensors (70) and (72) and generate sensor-status-data based on the result of such monitoring. For example, a customer may attempt to tamper with fluid meter (10) by subjecting fluid meter (10) to strong static magnetic fields or electromagnetic fields. When sensors (70) and (72) are subjected to a strong magnetic field, they may malfunction resulting in an invalid sensor-signal being generated. For the preferred embodiment, when processor (160) determines that one or both of magnetic field sensors (70) and (72) are generating an invalid sensor signal, processor (160) is configured to increase a counter value that tracks the number of times a particular sensor has generated an invalid sensor signal and store such counter value in memory. Processor (160) may be further configured to generate and store a time stamp comprising at least one of the day, hour, minute and second the invalid sensor signal was detected. Additionally, processor (160) may be configured to generate a duration-value representing the duration in time an invalid sensor-signal lasted. Processor (160) may then transfer at least part of the sensor-status-data to remote meter reading equipment operatively connected to data-unit (34).

Still further, in response to detecting an invalid sensor-signal, processor (160) may perform diagnostic tests on itself, other data-unit (34) components and components of sensor-unit (30). The results of such diagnostic test may be recorded in a memory associated with processor (160). At least part of the diagnostic test results may be transferred to remote meter reading equipment for review at a remote location.

Smart Transmitter

Figure 9B:
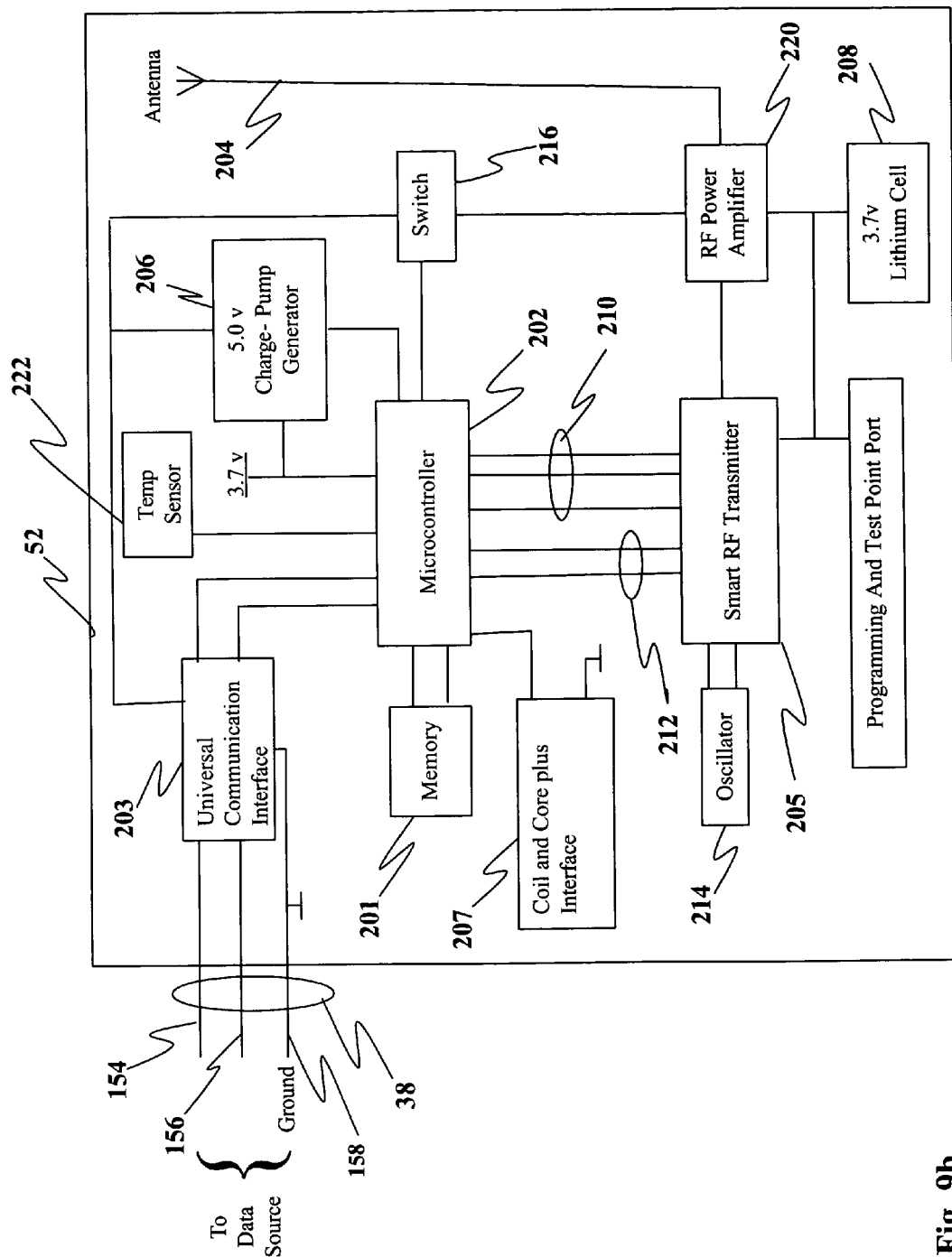
FIG. 9b is a block diagram illustration of one embodiment of a smart transmitter.

Now referring to FIG. 9b, one embodiment of smart transmitter (52) is depicted in a block diagram representation. Smart transmitter (52) communicates with external devices either by transmitting a data-signal (49) (FIG. 2b) over antenna (204), through universal communication interface (203), or coil/core interface (207). In the preferred embodiment, smart transmitter (52) is connected to data-unit (34) (one possible data-source) via universal communication interface (203) and data-cable (38). As previously noted, data-cable (38) is a three conductor cable comprising two data lines (154, 156) and a ground (158) over which serial communications is conducted. It will be appreciated, however, that any number of well known communication protocols and associated hardware may be used without departing from the scope of the present invention.

Smart transmitter (52) may also be programmed or reprogrammed by connecting a programming device, such as a laptop computer, to universal communication interface (203) or inductively through coil/core interface (206). Coil/core interface (206) may also be used to perform firmware upgrades.

For the preferred embodiment, power is supplied to the smart transmitter electronics by depletable power source (208). For one embodiment of the present invention, power source (208) is a 3.7 V lithium cell battery. In yet another embodiment of the present invention, power source (208) is replaced by rechargeable battery pack (164b). Similarly, power source (208) may be a rechargeable battery and may be connected to an energy converter, such as photovoltaic radome (44b).

For system components that require greater than 3.7 volts to operate, charge pump generator (206) is used to generate a voltage larger than the supply voltage from which it operates. For this embodiment of the present invention, charge pump generator (206) generates 5 volts. The output of charge pump generator (206) powers universal communication interface (203) and RF switch (216).

Smart transmitter (52) further comprises processor (202). One of the functions of processor (202) is to controls data transfers between data-unit (34), memory (201), and remote meter reading equipment (400) (FIG. 2b). It will be appreciated that memory (201) is optional and all data may be stored in memory located on microcontroller (202).

Processor (202) is further connected to coil/core interface (206). Coil/core interface is used to program microcontroller (202) as well as facilitate bios/firmware upgrades.

Still referring to FIG. 9b, processor (202) is shown connecting to temperature sensor (222). Temperature sensor (222) may be a discrete component, as shown in FIG. 9b, or it may be incorporated within processor (202). Microcontroller (202) uses temperature sensor (222) to monitor the ambient temperature within the smart transmitter (52) enclosure. Alternatively, a temperature sensor may be used to monitor the temperature of a particular component. Processor (202) may also generate and store temperature-data that is later used to make adjustments to various operating parameters for smart transmitter (52) as described later. Such temperature-data may also be transmitted to a remote computer.

Processor (202) further connects to smart RF transmitter (205). Smart RF transmitter (205) may be a single-chip transmitter or a transmitter circuit comprised of discrete components. Smart RF transmitter (205) transmits over a frequency range of 804 MHz to 940 MHz, although other frequency bands may be used without departing from the scope of the present invention. For example, smart RF transmitter (205) may be used in the well known 402/426/429/433/868/916 MHz ISM/SRD band systems. For the preferred embodiment of the present invention, smart transmitter (205) is a single-chip design that comprises (i) a communication bus for configuring and controlling the operation of the transmitter, (ii) a programmable output power level, (iii) a programmable output frequency, and (iv) may be powered by a 3.7 volt power source. Such transmitters are well known in the art and are manufactured by MAXIM, ATMEL, INFINEON, Texas Instruments, and Chipcon.

Returning to FIG. 9b, antenna (204) is shown connecting to RF power amplifier (220). The types of antennas that may be used include monopole, helical, and loop antennas. Antenna (204) is constructed so that its impedance matches the output impedance of RF power amplifier (220). For the preferred embodiment of the present invention, the output impedance of RF power amplifier (220) is 50 Ω.

Processor (202) configures/reconfigures smart RF transmitter (205) through transmitter communication interface (210). For the preferred embodiment of the present invention, transmitter communication interface (210) is a serial interface. Through transmitter communication interface (210), processor (202) can make configuration adjustments that affect the transmitter output power level, the frequency of the transmitted signal, and the transmitting mode. Processor (202) transfers the data to be transmitted over transmitter data bus (212).

In FIG. 9b, oscillator (214) is shown connecting to smart RF transmitter (205). Oscillator (214) (one exemplary embodiment of a reference-frequency-generator) generates the reference frequency used by smart RF transmitter (205) to establish the carrier frequency of the transmitted signal. For the preferred embodiment, oscillator (214) is a crystal oscillator that oscillates at a frequency of 14.7456 MHz although other references may be used. Smart RF transmitter (205) generates the carrier frequency of the transmitted signal by multiplying the output of oscillator (214) by a frequency-multiplier-value derived by an equation programmed into smart transmitter (205). Such frequency-multiplier-value is derived at least in part using a frequency-adjustment-value supplied by processor (202).

Frequency Stability

It is well known that a stable transmitted signal frequency is desired in almost all wireless communication systems. The more stable the transmitted signal frequency, the lower the cost of the electronics making up the receiver required to receive the transmitted signal. As noted above, for the present invention, a crystal oscillator is used to establish the reference frequency used by smart RF transmitter (205) to generate the carrier frequency of the transmitted signal. It will be appreciated that should the output of oscillator (214) drift, the carrier frequency of the transmitted signal will drift by such drift amount times the frequency-multiplier-value. For example, for a transmitted data-signal carrier frequency of 900 MHz and reference frequency of 14.7456 MHz, the frequency-multiplier-value would be 61.03516. If the reference frequency drifts by only 0.147456 MHz (1%) the carrier frequency will drift by about 9 MHz to 909 MHz.

Unfortunately, the outputs of all crystals drift as the temperature of the crystal changes. The more stable the crystal output frequency in response to changes in temperature, the more expensive the crystal. Fortunately, the drift of some low cost crystals substantially follow a known drift curve or know drift rate.

For one embodiment of the present invention, low cost crystals are used for oscillator (214) where the output of such crystal drifts in response to changes in temperature according to either a known frequency curve or known frequency rate (frequency-drift-data). If the frequency drifts according to a known drift rate, this value is stored in memory (201). If the frequency drifts according to a know drift curve, frequency drift/temperature change data representing such drift curve are stored in table form in memory (201). Both forms of oscillator output drift data are stored in memory (201) and are called frequency-drift-data.

For this embodiment of the present invention, processor (202) uses temperature sensor (222) to access real time (or near real time) temperature data relatable to the temperature of oscillator (214). For example, such temperature-data may be the ambient temperature within smart transmitter (52) enclosure, the ambient temperature within the pit (9), the temperature of at least part of the frequency-components that generate the reference-frequency. Processor (202) may store such temperature-data in memory (201) as well as transmit such temperature to a remote location.

Processor (202) may also compare such temperature-data to predefined temperature values. Such predefined temperature values may comprise max-temp value, min-temp value, and temp-range values. Such values are preferably predefined by a user and stored in memory (201). It should be apparent that such values would typically be selected by a user to signify possible problems should temperature sensor (222) generate temperature-data that exceeds or drops below a particular temperature value. For example, should processor (202) determine that temperature-data exceeds a predefined max-temp value, processor (202) may set a temperature-warning-flag and/or transmit at least one of the temperature-data and the max-temp value to a remote location.

Processor (202) then accesses the frequency-drift-data, determines a frequency-adjustment-value that substantially compensates for the expected drift in the reference-frequency due to a change in temperature, and sends the frequency-adjustment-value to smart RF transmitter (205) over transmitter communication bus (210). It should be appreciated that the frequency-adjustment-value may be incorporated into a configuration command that controls the Smart RF transmitter (205) output frequency. Alternatively, the frequency-adjustment-value may be used by smart RF transmitter (205) in its calculations for determining the carrier frequency of the transmitted signal. For the purposes of this invention, regardless of whether processor (202) or smart RF transmitter (205) makes the frequency adjustment, a frequency-adjustment-value may be said to have been sent from processor (202) to smart RF transmitter (205) in one form or another (i.e. as part of a configuration command, as a discrete value, etc.).

Transmitted Power Level Stability

Considered next is the effect the status of depletable power source (208) can have on the transmitted signal. As used in this document, the term "power quality" simply refers to any number of metrics typically used to benchmark the quality of the power provided by a power source. Such metrics include voltage level, current supplied, voltage level stability under load, etc., and provide a reference for tracking the status of a power source.

It is well known that the signal strength of a transmitted data-signal can weaken if the quality of power supplied to the transmitter/amplifier degrades beyond a certain point. For example, a transmitter my transmit a (X) dB signal when supplied with a voltage of 4.0 volts but transmit only a (X−0.5) dB signal when supplied with a voltage of 3.7 volts.

Notably, the status of depletable power source (208) that powers smart RF transmitter (205) and RF power amplifier (220) may degrade over time. As a result, the quality of power supplied by depletable power source (208) will degrade over time. As shown in FIG. 9b, the output of smart transmitter (205) is amplified by RF power amplifier (220). Should voltage supplied by depletable power source (208) to RF power amplifier (220) drop (as the status of the power source degrades over time), the power level of the transmitted data-signal will also drop. Thus, the status of depletable power source (208) is another parameter that processor (202) monitors.

Initially, power-level-adjustment-data is either calculated or experimentally measured. For example, the strength of a data-signal transmitted by smart transmitter (205) may be monitored as the voltage supplied to smart transmitter 205 and/or RF power amplifier (220) is varied. Any change in transmitted data-signal strength is documented for each supplied voltage level. Such power-level-adjustment-data may be stored in table form in a memory associated processor (202).

Processor (202) is configured to measures the voltage supplied by depletable power source (208). Processor (202) then accesses the power-level-adjustment data stored in memory (201). Using the power-level-adjustment data and the measured voltage level supplied by depletable power source (208), processor (202) reconfigures smart RF transmitter (205) to transmit at a power level that maintains a substantially constant transmitted data-signal power level. This configuration may be used to provide for a substantially constant transmitted data-signal power level as depletable power source (208) degrades over time. Processor (202) may additionally generate depletable power source status data and may transmit such data to a remote location using smart RF transmitter (205).

Transmit Modes

Presented next are the modes of operation for smart transmitter (52). As noted above, smart transmitter (52) is powered by a depletable power source. Consequently, minimizing power consumption is one goal of the present invention. Thus, to assist in minimizing power consumption, for the preferred embodiment, smart transmitter (52) does not transmit a data-signal continuously. Instead, smart transmitter (52) is placed in a sleep-mode during predefined periods. It will be appreciated that smart transmitter (52) does not include a receiver for receiving a transmitted signal. Consequently, one cannot transmit a wake up signal to smart transmitter to turn on smart transmitter (52). To overcome this problem, processor (202) is configured to track the passage of time.

Processor (202) may track the passage of time using any number of well known methods and technologies for tracking time. For the preferred embodiment, processor (202) is operatively connected to a time keeping circuit that generates time-data. Such time keeping circuit may be a device external to processor (202) or internal to processor (202). Alternatively, processor (202) may track the passage of time by executing a time keeping program. For this embodiment of the present invention, processor (202) tracks the day of the week and the time of day (hour, minute, and second). Next, processor (202) accesses transmitter-schedule-data stored in a memory associated with processor (202) for determining when to transmit a data-signal. Examples of transmitter-schedule-data include a transmit start time, stop time, and transmit sequence.

Using such time-data and transmitter-schedule-data, smart transmitter can be placed in a sleep-mode until processor (202) determines that a transmission session should begin. In addition, using such time-data, processor (202) can configure smart transmitter to transmit in one of many modes (described below).

For the present embodiment of the invention, smart RF transmitter (205) is initially placed in a sleep-mode. While in sleep-mode, smart RF transmitter (205) consumes minimal power (or no power). Processor (202) tracks the passage of time by generating or accessing time-data. Next, processor (202) access transmitter-schedule-data and compares the time-data to the transmitter-schedule-data. Examples of transmitter-schedule-data include a time period (such as 4:30 pm to 5:30 pm). When processor (202) determines that a transmission session should begin, processor (202) places smart transmitter (205) in a transmit-enable mode. The duration (length in time) of the transmit-enable mode may be a preset constant value or a user programmable value. While in transmit-enable mode, smart RF transmitter (205) may transmit a data-signal continuously or, to further conserve power, may transmit a data-signal according to a predefined transmit sequence. Restated, smart transmitter may be configured to transmit a data-signal for a predefined transmit-on time and then stop transmitting for a predefined transmit-off time. Such a sequence would repeat for the duration of the transmit-enable period.

Additionally, there could be set sequences tailored for a particular situation. For example, a walk-by transmit mode could be a transmitter sequence specifically selected for relatively slow moving persons walking through a neighborhood with remote meter reading equipment. For such situations, longer transmit-off times are desirable. Similarly, a drive-by transmit mode could be a transmitter sequence specifically selected for situations where the remote meter reading equipment will be attached to a moving vehicle. Such a transmitter sequence could be based on the speed limit in the surrounding area or a generic on-off sequence.

By way of example, consider the following transmission schedule. Processor (202) is programmed to enable smart transmitter for two hours on Mondays, Wednesdays, and Fridays, beginning at 4:00 pm. Processor (202) determines that it is 4:00 pm on a Monday and processor (202) places smart RF transmitter (205) in transmit-enable mode. Next, processor (202) accesses transmission sequence data stored in memory (201) and determines the transmission sequence to be used. For this example, the transmission sequence is as follows, transmit data-signal for six seconds and stop transmitting data-signal for 6 seconds. Processor (202) sends the corresponding configuration commands to smart RF transmitter (205) over transmitter communication bus (210). Smart RF transmitter (205) begins transmitting the data-signal for six seconds followed by a six second period without transmitting the data-signal. Processor (202) continues to track the passage of time until processor (202) determines that the current time is 6:00 pm. Next, processor (202) places the smart RF transmitter (205) back into sleep-mode.

Communications

Figure 11:
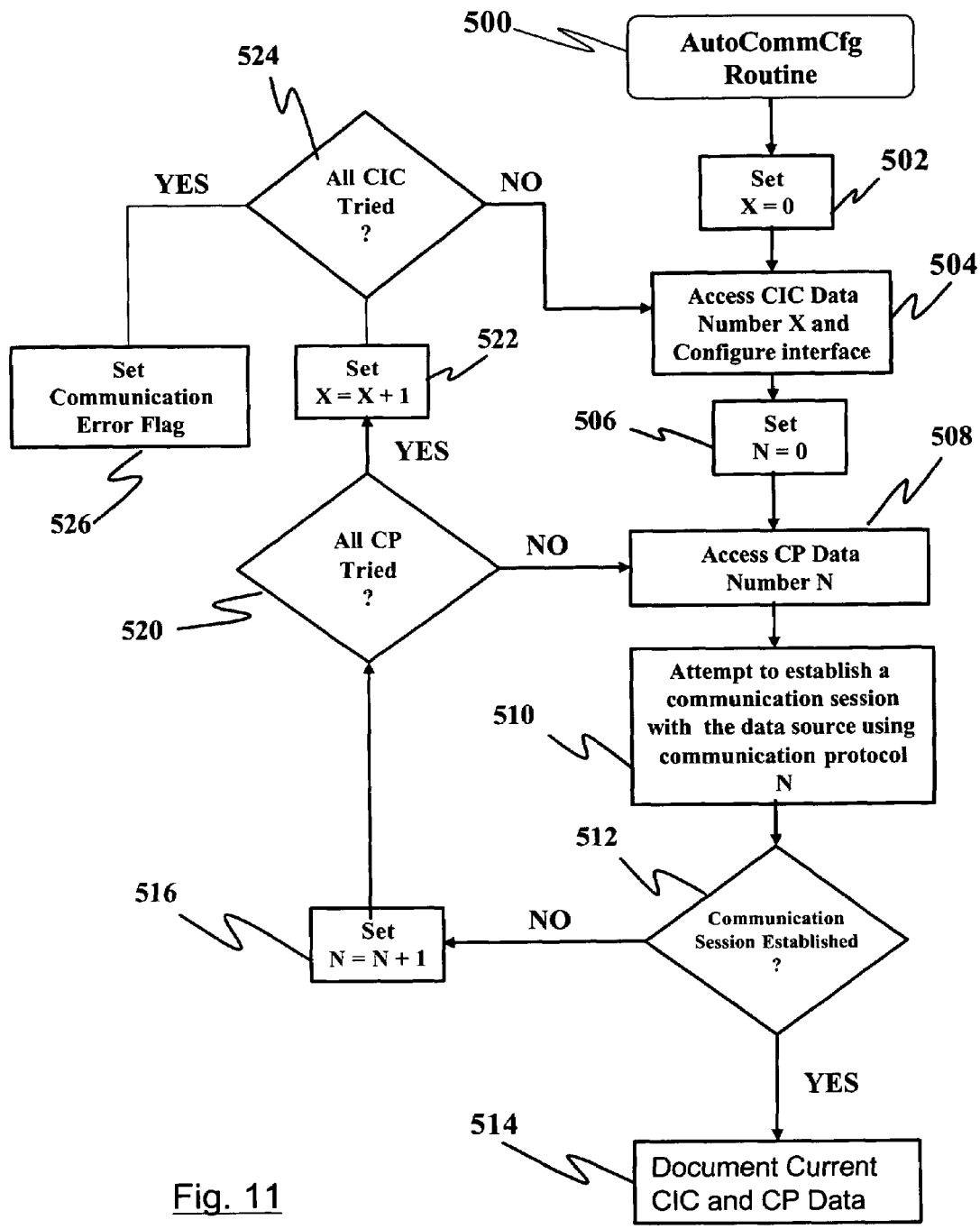
FIG. 11 is a flow chart representation of one exemplary AutoCommCfg Routine.
Figure 12:
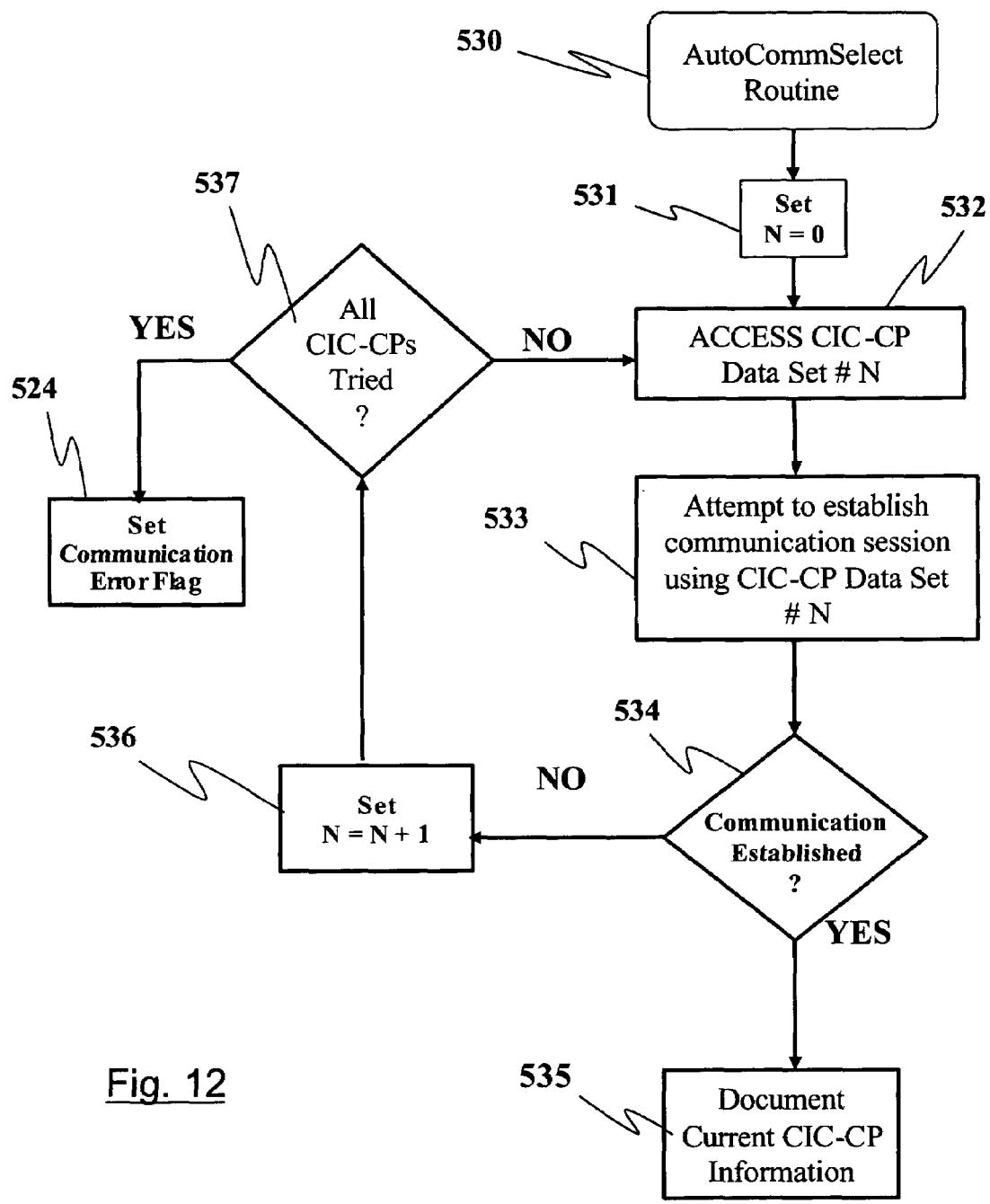
FIG. 12 is a flow chart representation of one exemplary AutoCommSelect Routine.
Figure 13:
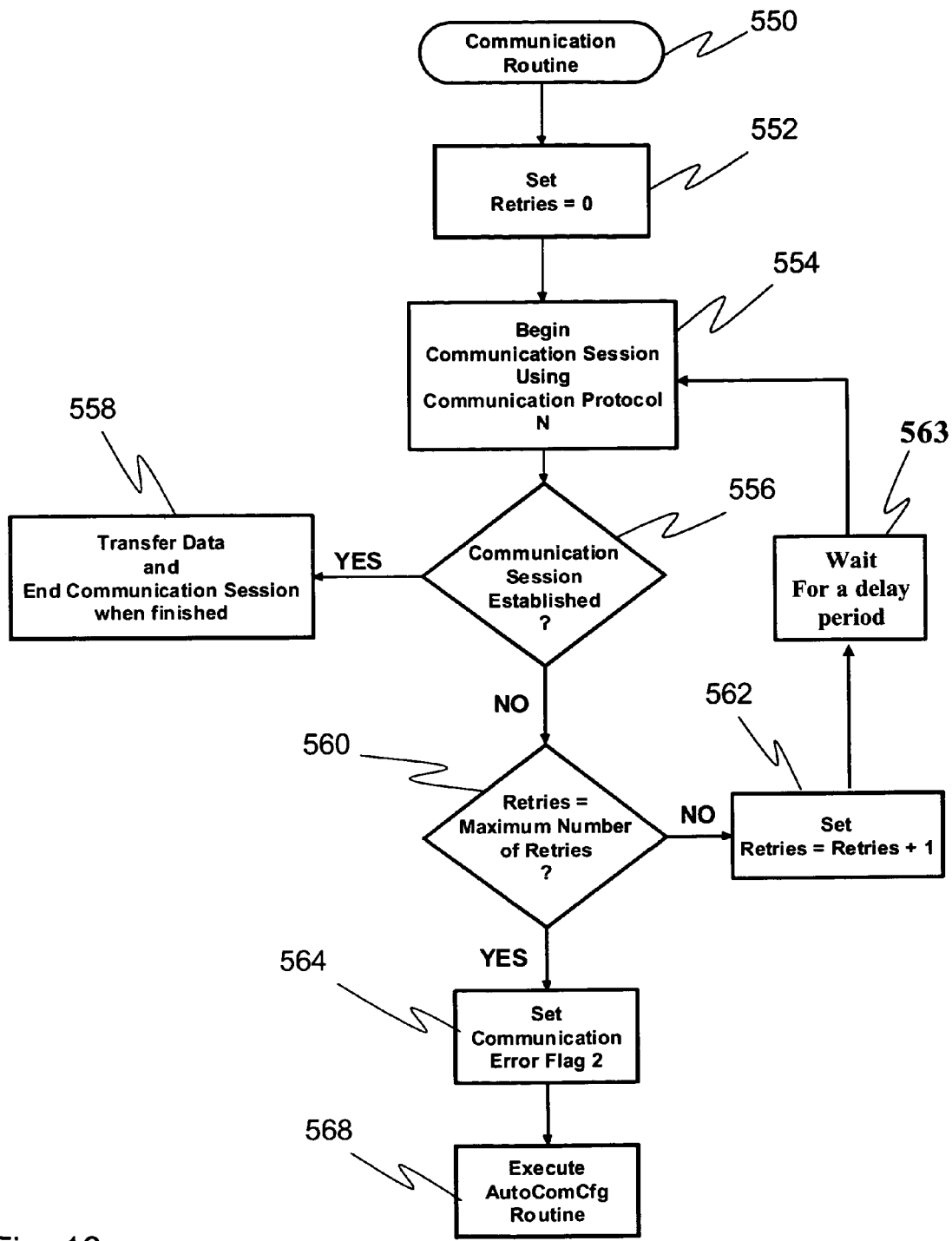
FIG. 13 is a flow chart representation of one exemplary Communication Routine.

Turning now to FIG. 11, a smart transmitter AutoComCfg routine (500) is presented. As noted previously, smart transmitter (52) is connected to an external data source through universal communication interface (203). It is desirable for smart transmitter (52) to have the ability to communicate to a plurality of data source types employing a plurality of communication protocols and communication interface configurations. In addition, while almost all data sources use a three conductor communication interface, the communication interface configuration for different data-sources may be different. Stated differently, while each data-source my use a three conductor communication interface, the three conductors of the communication interface may have different uses and associated requirements. Thus, it is desirable for smart transmitter (52) to have a universal communication interface that may be automatically configured.

By way of example, for data-source-X, assume that it is necessary for smart transmitter (52) to configure universal communication-interface (203) to assert 5.0 Volts on line (154). Next, when data-source-X determines that 5 Volts has been asserted on line (154), data-source-X will transmit data to smart transmitter (52) over line (156) using a standard 8 bit serial communication protocol where line (158) is the reference ground. Thus, for data-source-X, exemplary Communication Interface Configuration and Communication Protocol (CIC-CP) data set may be as follows: (1) L154=5 v; (2) L156=8 bit-serial, (3) L158=Ground.

Yet another exemplary set of CIC-CP data set for data-source-Y may be as follows: (1) L154=Clock; (2) L156=8 bid serial data synchronous with clock signal; (3) L158=Ground. For such CIC-CP data set, smart transmitter (52) asserts a clock signal on the L154 and the data-source-Y sends data on L156 back to smart transmitter (52) using an 8-bit synchronous communication protocol (synchronous with the clock signal on L154). Line L158 is again the reference ground.

In one embodiment of the present invention, predefined CIC-CP data set combinations for all known meter types of interest are stored in a memory associated with smart transmitter (52). When it becomes necessary to configure universal communication interface (203) to facilitate the transfer of data between a data source and smart transmitter (52), an AutoCommSelect Routine (described later) is performed where the known CIC-CP data combinations are used to configure the communication interface. This auto configuration routine provides a good balance between power consumption and performance.

It will be appreciated by one of ordinary skill in the art, however, that any number of different universal communication interface (203) configurations and communication protocols combinations may be employed by different data sources. Thus, for one alternative embodiment of the present invention, communication interface configuration (CIC) data is stored separately from communication protocol (CP) data. When it becomes necessary to configure the universal communication interface (203) an AutoCommCfg Routine (described later) is performed. For this configuration, the universal communication interface (203) is first configured for a particular configuration and then a plurality of communication protocols compatible with such communication interface configuration are used to attempt to establish a communication session between smart transmitter (52) and the connected data source. This auto configuration routine, while more versatile than the AutoCommSelect Routine, may consume more power than the AutoCommSelect Routine.

The AutoCommCfg (500) auto configuration routine is now considered. For this embodiment of the present invention, when auto configuration routine (500) is initiated, the value for counter X is set to zero (step 502). Next, processor control passes to step (504) where processor (202) accesses CIC data X and appropriately configures universal communication interface (203). At step (506), the value of counter N is set to zero. Next, processor (202) accesses Communication Protocol (CP) and attempts to establish a communication session with the data-source connected to smart transmitter (52) universal communication interface (203) (step 510). At step (512) processor (202) examines the data transferred from the data source to determine if the data fits a known data-template (i.e. determines if the received data is valid data or simply garbage). If the data fits a known data-template or is otherwise determined to be valid, then a successful communication session is deemed to have been established. If at step (510) the communication session is successfully established, processor (202) documents the current CIC and CP data for future reference. One possible documentation method would be to store the values for N and X in a memory associated with processor (202). These N and X values may then be used during future communication sessions to select the appropriate CIC and CP data thereby eliminating the need to perform the AutoCommCfg Routine during future communication sessions. Such functionally saves power as performing the AutoCommCfg Routine at the start of every communication session results in a relatively large drain on the depletable power source.

If at step (512) it is determined that a communication session can not be established using the current CP data, program control passes to step (516) where the N value is increased by 1. Program control then passes to step (520) where it is determined if all CPs have been tried. If all CPs have been tried without establishing a communication session, then the counter value of X is incremented and program control passes to step 524. If at step 524 it is determined that NOT all Communication Interface Configurations (CICs) have been tried, then processor (202) reconfigures universal communication interface (203) appropriately for the next CIC data. Next, all compatible CPs are again sequentially tried for the current universal communication interface (203) configuration.

If at step (524) it is determined that all CIC data have been tried, then processor (202) sets a communication Error Flag 1 and the routine ends.

The AutoCommSelect Routine (530) is now considered. At step (531) the value for counter N is set to zero. Next, processor (202) accesses CIC-CP data set N. At step (533), processor (202) appropriately configures universal communication interface (203) consistent with the CIC-CP data and attempts to establish a communication session the data source connected to universal communication interface (203) using the communication protocol specified by the CIC-CP data. Next, at step (534), processor (202) evaluates the data transferred to smart transmitter (52) from the data source. If the data is determined to be valid data (i.e. the data fits a known data template), then a successful communication session is deemed to have been established and processor (202) stores the N value in memory and the routine terminates.

If at step (534) it is determined that a communication session can not be established using the current CIC-CP data set, program control passes to step (536) where the N value is increased by 1. Program control then passes to step (537) where it is determined if all CIC-CPs have been tried. If all CIC-CPs have been tried without establishing a communication succession, communication Error Flag 1 is set.

It will be appreciated that the above described AutoCommCfg Routine (500) and AutoCommSelect Routine (530) may be initiated in several different ways. For example, when a smart transmitter is first connected with a data source, either the AutoCommCfg Routine or the AutoCommSelect Routine may be performed depending on which routine smart transmitter (52) is programmed to perform. Additionally, if during normal operation a communication error occurs for a predefined number of communication attempts or for a predefined length of time, then either the AutoCommCfg Routine or the AutoCommSelect Routine may be initiated by the smart transmitter (52) communication routine.

Exemplary smart transmitter (52) communication routine (550) is now considered. When communication between processor (202) a data source is required, processor (202) initiates Communication Routine (550). At step (552), processor (202) initializes the variable "Retries" to zero. Processor (202) then attempts to initiate a communication session with the data source using the N (or N and X) communication protocol and communication interface configuration (step 554). If a communication session is successfully established, data is transferred between processor (202) and the data source. If the communication session is unsuccessful, the processor checks to see if the maximum number of attempts to establish a communication session has been reached by examining the value of the "Retries" variable (step 560). If the maximum number of retries has not been reached, processor (202) adds 1 to the variable "Retries" (step 562) and transfers program control a delay command (step 563). The delay command places the communication routine in a wait state for a predefined delay period. Such a delay period provides the user with the ability to limit the number of retries during a select period of time. The delay period could be measured in days, hours, minutes, and/or seconds. One purpose of the delay period is to help minimize power consumption by the communication routine. Once the delay period has elapsed, program control passes back to step (554). If the maximum number of retries has been reached, processor (202) sets Communication Error Flag 2 (step 564). Next, processor (202) executes the AutoCommCfg Routine (500) in an attempt to reconfigure the communication interface.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A transmitter for transmitting data from a utility meter to a remote location, said transmitter comprising:
   a processor operatively connected to transmitter circuitry and a depletable power source, wherein said transmitter circuitry is electrically associated with an antenna;
   a memory electrically associated with said processor for storing power-level-adjustment-data wherein such power-level-adjustment-data comprises a plurality of data pairs comprising power-level-adjustment-values and supplied-voltage-level-values;
   wherein said processor is configured to retrieve utility-data from a data-source electrically associated with said processor and transfer at least part of said utility-data to the transmitter circuitry;
   wherein said transmitter circuitry is configured to transmit a data-signal to a remote location, said data-signal comprising at least part of said utility-data;
   wherein said processor is operable to configure said transmitter circuitry to transmit said data-signal at different power levels;
   wherein the power level of the transmitted data-signal is affected by the quality of power supplied to the transmitter circuitry; and
   wherein the processor is further configured to (1) determine the real-time voltage level being supplied by the depletable power source, (2) retrieve the power-level-adjustment-value paired with the supplied-voltage-level-value that best matches said real-time voltage value, and (3) use the retrieved power-level-adjustment-value to automatically adjust the power level of the transmitted data-signal to compensate for a reduction in the quality of the power supplied by said depletable power source.

2. A transmitter for transmitting data from a utility meter to a remote location as in claim 1, wherein said processor is further configured to transmit said data-signal in (i) a walk-by transmit mode having a first transmit-on time/transmit off-time transmitter sequence, and (ii) a drive-by transmit mode having a second transmit-on time/transmit off-time transmitter sequence wherein the transmit-one time for said first transmitter sequence is longer than the transmit-on time for the second transmitter sequence.

3. A transmitter for transmitting data from a utility meter to a remote location as in claim 1, wherein the processor maintains a substantially constant transmitted data-signal power level.

4. A transmitter for transmitting data from a utility meter to a remote location as in claim 1, wherein the processor generates depletable power source status data and uses said transmitter circuitry to transmit said depletable power source status data to a remote location.

5. A transmitter for transmitting data from a utility meter to a remote location as in claim 1, wherein said depletable power source is a rechargeable battery that is recharged by an energy-converter.

6. A transmitter for transmitting data from a utility meter to a remote location as in claim 5, wherein said energy-converter is a photovoltaic device that generates electricity by absorbing electromagnetic radiation.

7. A transmitter for transmitting data from a utility meter to a remote location as in claim 6, wherein said photovoltaic device is a photovoltaic radome.

8. A method for transmitting data from a utility meter to a remote location, said method comprising:
   providing a transmitter comprising a processor electrically associated with transmitter circuitry, each electrically associated with a depletable power source wherein said transmitter circuitry is further electrically associated with an antenna;
   associating said transmitter with a data-source, said data-source configured for storing utility-data;
   retrieving data from said data-source and transmitting a data-signal to a remote location, said data-signal comprising at least part of said data;
   monitoring the status of said depletable power source and adjusting the power level of the transmitted data-signal to maintain the transmitted power level of said data-signal between a upper limit and lower limit;
   storing a plurality of transmitter-schedule-data-sets in said memory, wherein each of said transmitter-schedule-data-sets includes a data-signal-power-level value, a communication-session-start-time value, communication-session-stop-time value, and transmit-sequence value; and wherein said plurality of transmitter-schedule-data-sets define at least two of (a) a walk-by mode, (b) a drive-by mode, and (c) a fixed network mode.

9. A method for transmitting data from a utility meter to a remote location as in claim 8, further comprising the step of maintaining a substantially constant transmitted data-signal power level.

10. A method for transmitting data from a utility meter to a remote location as in claim 8, further comprising the step of generating depletable power source status data and transmitting said depletable power source status data to said remote location.

11. A method for transmitting data from a utility meter to a remote location as in claim 8, further comprising the step of recharging said depletable power source with a photovoltaic device that generates electricity by absorbing electromagnetic radiation.

12. A method for transmitting data from a utility meter to a remote location as in claim 8, wherein said depletable power source also supplies power to said data-source.

13. A multimode transmitter for transmitting data from a utility meter to a remote location, said transmitter comprising:
   a transmitter housing;
   a processing device disposed within said housing;
   a memory electrically associated with said processing device and configured for storing a plurality of transmitter-schedule-data-set values, wherein each of said transmitter-schedule-data-set values includes a data-signal-power-level value, a communication-session-start-time value, communication-session-stop-time value, and transmit-sequence value; and
   programmable transmitter circuitry electrically associated with said processing device and an antenna, wherein said transmitter circuitry is programmable for transmitting a data-signal at a plurality of power levels;
   a depletable power source electrically associated with said processing device and said transmitter circuitry;
   wherein said processing device is further configured to receive utility-data from a data-source electrically associated with the processing device;
   wherein said processing device id further configured to track the passage of time and define time-data;
   wherein said processing device is further configured to place said transmitter circuitry in a sleep-mode until said time-data value is between the communication-session-start-time value and the communication-session-stop-time value for a transmitter-schedule-data-set;
   wherein said processing device is further configured to program said transmitter circuitry to transmit a data-signal consistent with the values defined by said transmitter-schedule-data-set when the time-data value is between the communication-session-start-time value and the communication-session-stop-time value for said transmitter-schedule-data-set; and
   wherein said data-signal comprises at least part of said utility-data.

14. A transmitter as in claim 13, further comprising a coil-interface electrically associated with said processing device, said coil-interface configured for communicating with an external electronic device.

15. A transmitter as in claim 14, wherein said coil-interface is operable for (a) updating the transmitter's firmware code and (b) transferring data from said transmitter to said external electronic device.

16. A transmitter as in claim 13, wherein said transmitter further comprises in interface electrically associated with said processing device, said interface configured to automatically receive data from a plurality of data-sources employing a plurality of communication protocols.

17. A transmitter as in claim 13, wherein said transmitter-schedule-data-set values define at least two of (a) a walk-by mode, (b) a drive by mode, and (c) a fixed network mode.

18. A transmitter as in claim 17, wherein said data signal comprises at least part of said transmitter-schedule-data-set value for the selected transmitter-schedule-data-set.

19. A transmitter as in claim 14, wherein the selected transmitter-schedule-data-set can be changed using said coil-interface.

20. A transmitter as in claim 13, wherein said power source is disposed in said transmitter housing.

21. A transmitter as in claim 20, wherein said power source is a rechargeable batter that is recharged by an energy-converter.

22. A transmitter as in claim 13, further comprising a temperature sensor electrically associated with said processing device and wherein said processing device is configured to use said temperature sensor to define temperature-data.

23. A transmitter as in claim 22, wherein said data-signal comprises temperature-data.

24. A transmitter as in claim 23, wherein said processing device is configured to transmit a data-signal according to at least two different transmitter-schedule-data-sets during at least one day of a seven day period.

25. A transmitter for transmitting data from a utility meter to a remote location, said transmitter comprising:
   an antenna;
   a transmitter electrically associated with said antenna, said transmitter programmable for transmitting a data-signal at a plurality of power levels;
   a processing device electrically associated with a data-source and configured for receiving utility-data from said data-source;
   wherein said processing device is electrically associated with said transmitter through a programming-buss and a data-buss, said programming-buss configured for transferring configuration data to said transmitter, and wherein said data-buss is configured for transferring utility-data to said transmitter;
   a memory electrically associated with said processing device and configured for storing a plurality of transmitter-schedule-data-sets, wherein each of said transmitter-schedule-data-sets includes: (a) transmission-session-start-time value, (b) a transition-session-stop-time, (c) a transmission-on time, and (d) a transmission-off time;
   a depletable power source configured for supplying power to said processing device and said transmitter;
   wherein said processing device is further configured to track the passage of time and use current time data and the transmission-session-start-time value to determine when to enable said transmitter thereby starting a transmission-session, wherein said processing device further configures said transmitter to repetitively transmit a data-signal for a time period substantially equal to the transmission-on time and then stop transmitting for a time period substantially equal to said transmission-off time until the processing device determines that the transmission session has ended and places said transmitter into a sleep-mode; and
   wherein said data-signal comprises at least part of said utility-data.

26. A transmitter as in claim 25, wherein one transmitter-schedule-data-set defines a walk-by mode and one transmitter-schedule-data-set defines a drive-by mode.

27. A transmitter as in claim 26, wherein one transmitter-schedule-data-set defines a fixed network mode.

28. A transmitter as in claim 25, further comprising a mushroom shaped transmitter housing comprising a radome section and a stem section.

29. A transmitter as in claim 28, wherein said antenna, said transmitter, and said processing device is disposed in said radome section and said depletable power source is disposed in said stem section.

30. a transmitter as in claim 29, wherein said depletable power source is a rechargeable battery electrically associated with a photovoltaic recharging device.

31. A transmitter as in claim 30, wherein said transmitter housing is suitably sized to be mechanically associated with a pit lid, said pit lid having a top surface and a bottom surface with a section of said pit lid defining a hole there through, wherein the radome section of said transmitter housing rests generally adjacent to said top surface with said stem section extending through said hole.

* * * * *